(12) United States Patent
Hacigumus et al.

(10) Patent No.: US 7,783,900 B2
(45) Date of Patent: *Aug. 24, 2010

(54) QUERYING ENCRYPTED DATA IN A RELATIONAL DATABASE SYSTEM

(75) Inventors: Vahit Hakan Hacigumus, San Jose, CA (US); Balakrishna Raghavendra Iyer, San Jose, CA (US); Sharad Mehrotra, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/272,460

(22) Filed: Nov. 17, 2008

(65) Prior Publication Data

US 2009/0077378 A1 Mar. 19, 2009

Related U.S. Application Data

(63) Continuation of application No. 10/449,421, filed on May 30, 2003, now Pat. No. 7,500,111.

(51) Int. Cl.
*H04K 1/00* (2006.01)
*H04L 9/00* (2006.01)
*G06F 11/30* (2006.01)
*G06F 17/00* (2006.01)
*G06F 17/30* (2006.01)
*G06F 9/44* (2006.01)

(52) U.S. Cl. ............... 713/193; 713/165; 713/189; 713/190; 380/279

(58) Field of Classification Search ............... 713/193, 713/165, 190, 189; 380/279
See application file for complete search history.

(56) References Cited

U.S. PATENT DOCUMENTS 5,442,699 A 8/1995 Arnold et al.

(Continued)

FOREIGN PATENT DOCUMENTS

EP 0855656 7/1998

(Continued)

OTHER PUBLICATIONS

Hakan Hacigumus, Bala Iyer, Chen Li, Sharad Mehrotra, "Research sessions: potpourri: Executing SQL over encrypted data in the database-service-provder model", Jun. 2002, Proceedings of the 2002 ACM SIGMOD international conference on Management of data SIGMOD '02, pp. 216-227.*

(Continued)

*Primary Examiner*—Matthew B Smithers
*Assistant Examiner*—Courtney D Fields
(74) *Attorney, Agent, or Firm*—Gates & Cooper LLP

(57) ABSTRACT

A client-server relational database system, wherein data from the client computer is encrypted by the client computer and hosted by the server computer, the encrypted data is operated upon by the server computer, using one or more operators selected from a group of operators comprising: (a) inequality logic operators, (b) aggregation operators, and (c) wildcard matching operators, to produce an intermediate results set, the intermediate results set is sent from the server computer to the client computer, and the intermediate results set is decrypted and filtered by the client computer to produce actual results. The group of operators is limited because the encrypted results set, when decrypted, includes inaccuracies therein. The client computer applies a set of correction procedures to the decrypted results set to remove the inaccuracies therein.

12 Claims, 9 Drawing Sheets

U.S. PATENT DOCUMENTS

| | | | |
|---|---|---|---|
| 5,713,018 | A | 1/1998 | Chan |
| 5,822,751 | A | 10/1998 | Gray et al. |
| 5,963,642 | A | 10/1999 | Goldstein |
| 6,226,629 | B1 | 5/2001 | Cossock |
| 6,275,824 | B1 | 8/2001 | O'Flaherty et al. |
| 6,275,939 | B1 | 8/2001 | Garrison |
| 6,446,092 | B1 | 9/2002 | Sutter |
| 6,785,810 | B1 | 8/2004 | Lirov et al. |
| 6,792,425 | B2 | 9/2004 | Yagawa et al. |
| 6,957,341 | B2 | 10/2005 | Rice et al. |
| 7,228,416 | B2 | 6/2007 | Nishizawa et al. |
| 7,266,699 | B2 | 9/2007 | Newman et al. |
| 7,500,111 | B2 | 3/2009 | Hacigumus et al. |
| 2001/0019614 | A1 | 9/2001 | Madoukh |
| 2002/0038421 | A1 | 3/2002 | Hamada |
| 2002/0129260 | A1 | 9/2002 | Benfield et al. |
| 2002/0174355 | A1 | 11/2002 | Rajasekaran et al. |
| 2003/0055824 | A1 | 3/2003 | Califano |
| 2003/0061205 | A1 | 3/2003 | Cleghorn et al. |
| 2003/0123671 | A1 | 7/2003 | He et al. |
| 2004/0181679 | A1 | 9/2004 | Dettinger et al. |
| 2005/0044366 | A1 | 2/2005 | Pucheral et al. |

FOREIGN PATENT DOCUMENTS

| | | | |
|---|---|---|---|
| WO | WO 03081464 A2 | * | 10/2003 |

OTHER PUBLICATIONS

Ravi Chandra Jammalamadaka, Sharad Mehrotra, Nalini Venkatasubramanian, "Pvault: a client server system providing mobile access to personal data", Nov. 2005, StorageSS '05: Proceedings of the 2005 ACM workshop on Storage security and survivability, pp. 123-129.*

Adam, N.R., "Security-Control Methods for Statistical Databases: A Comparative Study" ACM Computing Surveys, vol. 21., No. 4, pp. 515-556, Dec. 1989.

Agrawal, R., et. al., "Watermarking Relational Databases" Proc. Of the 28th VLDB Conference, Hong Kong, China, 2002.

Agrawal, R., et. al., "Hippocratic Databases" Proc. Of the 28th VLDB Conference, Hong Kong, China, 2002.

Bouganim, L., et al., "Chip-Secured Data Access: Confidential Data on Untrusted Servers" Proc. Of the 28th VLDB Conference, Hong Kong, China, 2002.

Buell, D. A., et al., "A Multiprecise Integer Arithmetic Package" The Journal of Supercomputing 3, pp. 89-107, Kluwer Academic Publishers, Mar. 1989.

Cho, J. "A Fast Regular Expression Indexing Engine" Proc. Of International Conference on Data Engineering, 2002, pp. 1-12.

Digital Bibliography & Library Project. http://dblp.uni-trier.de/ May 24, 2004.

Federal Information Processing Standards Publication, "Announcing the Advanced Encryption Standard (AES)" Publication 197, pp. 1-47, Nov. 26, 2001.

Federal Information Processing Standards Publication, "Data Encryption Standard (DES)" Publication 46-3, pp. 1-22, Oct. 25, 1999.

Gaines, H., "Cryptanalysis; a study of ciphers and their solutions" Dover 1956, http://www-math.cudenver.edu/~wcherowi/courses/m5410/engstat.html.

Granlund, T., "GNU MP, The GNU Multiple Precision Arithmetic Library" TMG Datakonsult, Edition 2.0.2, pp. 1-41, Jun. 1996.

Hacigumus, H., et al., "Encrypted Database Integrity in the Database Service Provider Model" In Proc. of International Workshop on Certification and Security in E-Services (CSES'02), IFIP WCC, 2002.

He, J., et al., "Cryptography and relational database management systems" In Proc. of International Database Engineering & Applications Symposium, 2001.

Ioannidis, Y.E., et al., "Histogram-Based Approximation of Set-Valued Query Answers" Proc. Of the 25th VLDB Conference Edinburgh, Scotland, pp. 174-185, 1999.

ISO/IEC, "Information Technology—Database Language SQL (Proposed revised text of DIS 9075)" Jul. 30, 1992.

Jagadish, H.V., et al., "Global Optimization of Histograms" ACM SIGMOND, Santa Barbara, California, May 21-24, 2001.

Menezes, A.J., et al., "Handbook of Applied Cryptography" p. 41-45, CRC Press 1997.

Piatetsky-Shapiro, G., et al., "Accurate Estimation of the Number of Tuples Satisfying a Condition" ACM, pp. 256-276, 1984.

Rivest, R.L., et al., "A Method for Obtaining Digital Signatures and Public-Key Cryptosystems" Communications of ACM, 21(2), pp. 1-15, 1978.

Schneier, B., "Description of a New Variable-Length Key, 64-Bit Block Cipher (Blowfish)" Fast Software Encryption, Cambridge Security Workshop Proceedings, Springer-Verlag, pp. 191-204, 1994.

Serpette, B., "BigNum: a portable and efficient package for arbitrary-precision arithmetic," Technical Report 2, Digital Equipment Corporation and INRIA, pp. 1-29, 1989.

Shand, M., et al., "Hardware speedups in long integer multiplication" In Proc. of ACM Symposium on Parallel Algorithms and Architectures, pp. 138-145, 1990.

Silberschatz, A., et al., "Database System Concepts", Third Edition, WCB McGraw-Hill, pp. 418-426, 1997.

Song, D.X., et al., "Practical Techniques for Searches on Encrypted Data", In Proc. IEEE, pp. 44-56, 2000.

Traub, J.F., et al., "The statistical security of a statistical database" ACM Transactions on Database Systems (TODS), vol. 9, No. 4, pp. 672-679, 1984.

Vulliemin, J. et al., "Programmable active memories: Reconfigurable systems come of age" IEEE Transactions on VLSI Systems, vol. 4, Issue 1, pp. 56-69, 1996.

Winslett, M. "Jeffrey D. Ullman Speaks Out on the Future of Higher Educaiton Startups" Database Theory, and More SIGMOND Record, vol. 30, No. 3, 2001.

N. Ahituv et al., "Processing Encrypted Data" *Communications of the ACM*, 30(9) pp. 777-780, 1987.

E. Brickell et al., "On Privacy Homomorphisms" In Proc. Advances in Coptology-Eurocrypt '87, pp. 117-125, 1988.

S. Chaudhuri, "An Overview of Query Optimization in Relational Systems" In Proc. of ACM Symposium on Principles of Database Systems (PODS), pp. 34-43, 1998.

S. Chaudhuri et al., "Including Group-By in Query Optimization" In Proc. of VLDB, pp. 354-366, 1994.

R. Power, Computer Security Institute, "Computer Security Issues & Trends: 2002 CSI/FBI Computer Crime and Security Survey" 8(1) pp. http://www.gocsi.com, 2002.

ComputerWorld, "J.P. Morgan signs outsourcing deal with IBM" 3pp. Dec. 30, 2002.

ComputerWorld, "Business Process Outsourcing" 4pp., Jan. 1, 2001.

U. Dayal, "Of nests and trees: A unified approach to processing queries that contain nested subqueries, aggregates, and quantifiers" In Proc. of VLDB, pp. 197-208, 1987.

J. Domingo-Ferrer, "A new privacy homomorphism and applications" Information Processing Letters, 60(5):277-282, 1996 [7pp including cover/publication page].

J. Domingo-Ferrer, "Multi-applications smart cards and encrypted data processing" Future Generation Computer Systems, 13:65-74, 1997, [preprint: Nov. 28, 1996 pp. 1-16].

C. A. Galindo-Legaria et al., "Orthogonal optimization of subqueries and aggregation" In Proc. of ACM SIGMOD, pp. 369-374, 2001.

H. Garcia-Molina et al., "Database Systems: The Complete Book" Prentice Hall, pp. 369-374, 2002.

G. Graefe et al., "The EXODUS optimizer generator" In Proc. of ACM SIGMOD, pp. 160-172, 1987.

H. Hacigumus et al., "Executing SQL over Encrypted Data in Database Service Provider Model" In Proc. of ACM SIGMOD, pp. 216-227, 2002.

H. Hacigumus et al., "Providing Database as a Service" In Proc. of ICDE, 10pp., 2002.

W. Kim, "On optimizing an SQL-like nested query" ACM Transactions on Database Systems (TODS), 7(3):443-469, 1982.

M. Muralikrishna, "Optimization and dataflow algorithms for nested tree queries" In Proc. of VLDB, pp. 77-85, 1989.

R. L. Rivest et al., "On Data Banks and Privacy Homomorphisms" *In Foundations of Secure Computation*, pp. 169-177, 1978.

D. R. Stinson, "Crytography: Theory and Practice" CRC Press, pp. 114-125 (plus title/publication page), 1995.

TPC-H. Benchmark Specification, Revision 2.1.0, http://www.tpc.org/tech, pp. 1-145.

Peter Wayner, "Translucent Databases" Flyzone Press, (2002), 10 pp.

Neal R. Wagner et al., "Encrypted Database Design: Specialized Approaches" IEEE, (1986), pp. 148-153.

Hacigumus et al., "Query Optimization in Encrypted Database Systems," Proceedings of the 10th Database Systems for Advanced Applications Conference, Apr. 2005, pp. 43-55.

* cited by examiner (a) Original query tree.

(b) Replacing encrypted relations.

(c) Doing selection at server.

(d) Multiple interactions between Client and Server.

(a) Query tree with join computation at Server.

(b) Rewriting difference operator using outerjoin.

(c) After pulling selection and projection.

(d) Final query tree.

QUERYING ENCRYPTED DATA IN A RELATIONAL DATABASE SYSTEM

CROSS-REFERENCE TO RELATED APPLICATION

This application is continuation under 35 U.S.C. §120 of U.S. patent application Ser. No. 10/449,421, filed on May 30, 2003, by Vahit H. Hacigumus et al., entitled "QUERYING ENCRYPTED DATA IN A RELATIONAL DATABASE SYSTEM," which application is incorporated by reference herein.

BACKGROUND OF THE INVENTION

1. Field of the Invention

This invention relates in general to database management systems performed by computers, and in particular, to querying encrypted data in a relational database system.

2. Description of Related Art (Note: This application references a number of different publications, as indicated throughout the specification by one or more reference numbers. A list of these different publications ordered according to these reference numbers can be found below in the section entitled "References." Each of these publications is incorporated by reference herein.)

The Internet has made it possible for all computers to be connected to one another. The influence of transaction-processing systems and the Internet ushered in the era of e-business. The Internet has also had a profound impact on the software industry. It has facilitated an opportunity to provide software usage over the Internet, and has led to a new category of businesses called "application service providers" or ASPs.

ASPs provide worldwide customers the privilege to use software over the Internet. ASPs are staffed by experts in the art of putting together software solutions, using a variety of software products, for familiar business services such as payroll, enterprise resource planning, and customer-relationship marketing. ASPs offer their services over the Internet to small and large worldwide organizations. Since fixed costs are amortized over a large number of users, there is the potential to reduce the service cost even after possibly increased telecommunications overhead.

It is possible to provide storage and file access as services. The natural question is the feasibility of providing the next value-add layer in data management. From the business perspective, database as a service inherits all the advantages of the ASP model, indeed even more, given that a large number of organizations have their own database management systems (DBMSs). The model allows organizations to leverage hardware and software solutions provided by the service providers, without having to develop them on their own. Perhaps more importantly, it provides a way for organizations to share the expertise of database professionals, thereby cutting the people cost of managing a complex information infrastructure, which is important both for industrial and academic organizations [15].

From the technological angle, the model poses many significant challenges foremost of which is the issue of data privacy and security. In the database-service-provider model, user data resides on the premises of the database-service provider. Most corporations view their data as a very valuable asset. The service provider would need to provide sufficient security measures to guard data privacy.

At least two data-privacy challenges arise. The first challenge is: how do service providers protect themselves from theft of customer data from hackers that break into their site and scan disks? Encryption of stored data is the straightforward solution, but not without challenges. Trade-offs need to be made regarding encryption techniques and the data granularity for encryption.

This first challenge was examined by Hacigümüs, et al. [6]. It was found that hardware encryption is superior to software encryption. Encrypting data in bulk reduced the per-byte encryption cost significantly, exposing to startup overheads. Encrypting by row was found preferable to encrypting by field for queries from the TPC-H benchmark [14].

The second challenge is that of "total" data privacy, which is more complex since it includes protection from the database provider. The requirement is that encrypted data may not be decrypted at the provider site. A straightforward approach is to transmit the requisite encrypted tables from the server (at the provider site) to the client, decrypt the tables, and execute the query at the client. But, this approach mitigates almost every advantage of the service-provider model, since now primary data processing has to occur on client machines. It will become clear later, for a large number of queries such as selections, joins, and unions, much of the data processing can be done at the server, and the answers can be computed with little effort by the client.

What is needed in the art are servers, hosted by the service provider, that store encrypted databases, and clients that can access and decrypt the encrypted databases. Further, there is need for a certain amount of query processing to occur at the server without jeopardizing data privacy. While data privacy is paramount, there is also a need for adequate performance of any queries performed by the servers. The present invention satisfies these needs.

There is previous work in different research areas, some of which are related to the present invention. Search on encrypted data [2], where only keyword search is supported, and doing arithmetic over encrypted data [10] have been studied in the literature. However, functionalities provided by those are very limited and insufficient in executing complex SQL queries over encrypted data.

SUMMARY OF THE INVENTION

To overcome the limitations in the prior art described above, and to overcome other limitations that will become apparent upon reading and understanding the present specification, the present invention discloses a client-server relational database system, wherein data from the client computer is encrypted and hosted by the server computer, the encrypted data is operated upon by the server computer, using one or more operators selected from a group of operators comprising: (a) inequality logic operators, (b) aggregation operators, and (c) wildcard matching operators, to produce an intermediate results set, the intermediate results set is sent from the server computer to the client computer, and the intermediate results set is decrypted and filtered by the client computer to produce actual results. The group of operators is limited because the encrypted results set, when decrypted, includes inaccuracies therein. The client computer applies a set of correction procedures to the decrypted results set to remove the inaccuracies therein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural and functional changes may be made without departing from the scope of the present invention.

1. Overview

Figure 1:
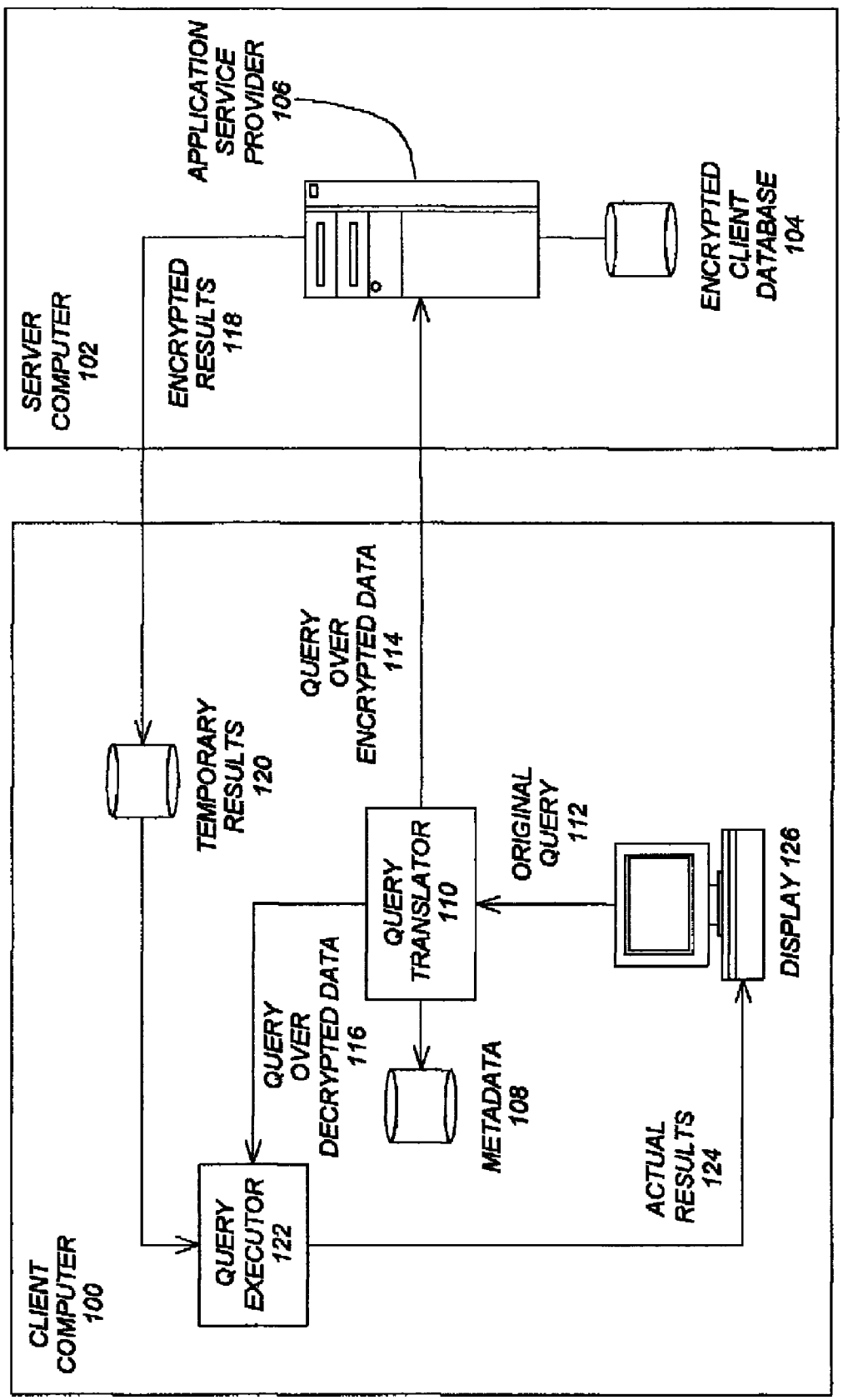
FIG. 1 is block diagram that illustrates the basic architecture and control flow of the preferred embodiment of the present invention.

FIG. 1 is block diagram that illustrates the basic architecture and control flow of the preferred embodiment of the present invention. This architecture is known as the "database as a service" (DAS) model, which involves trusted clients and an untrusted server.

In this illustration, there are three fundamental entities. A client computer 100 encrypts data and stores the encrypted data at a server computer 102 in an encrypted client database 104 managed by an application service provider 106. The encrypted client database 104 is augmented with additional information (which we call the index) allows certain amount of query processing to occur at the server computer 102 without jeopardizing data privacy. The client computer 100 also maintains metadata 108 which is used by a query translator 110 for translating the user query 112 into different portions, i.e., a query over encrypted data 114, for execution on the server computer 102, and a query over decrypted data 116, for execution on the client computer 100. The server computer 102 generates an encrypted intermediate results set 118, which is provided to the client computer 100 and stored as temporary results 120. The client computer 100 includes a query executor 122 that decrypts the temporary results 120 and performs the query over decrypted data 116 in order to generate actual results 124 for display 126 to the user.

Specifically, data from a client computer 100 is encrypted by the client computer and hosted by a server computer 102, the encrypted data is operated upon by the server computer 102, using one or more operators selected from a group of operators comprising: (a) inequality logic operators, (b) aggregation operators, and (c) wildcard matching operators, to produce an encrypted intermediate results set 118, the encrypted intermediate results set 118 is sent from the server computer 102 to the client computer 100, and the intermediate results set 118 is decrypted and filtered by the client computer 100 to produce actual results. In this logic, the group of operators is limited because the encrypted intermediate results set 118, when decrypted, includes inaccuracies therein. Moreover, the client computer 100 applies a set of correction procedures to the decrypted intermediate results set 118 to remove the inaccuracies therein.

In this environment the client computer 100 maintains the needed encryption key(s), and the data is encrypted by the client computer 100 before it is sent to the server computer 102 for inclusion in the encrypted client database 104. Consequently, the data is always encrypted when it is stored on or processed by the server computer 102. Moreover, at no time are the encryption keys given to the server computer 102, and thus the data can never be decrypted by the server computer 102.

2. Relation Encryption And Storage Model

Before we discuss techniques for query processing over encrypted data, let us first discuss how the encrypted data is stored at the server.

For each relation $R(A_1, A_2, \ldots, A_n)$, we store on the server an encrypted relation:

$$R^S(\text{etuple}, A_1^S, A_2^S, \ldots, A_n^S)$$

where the attribute etuple (We will explain how etuple is defined in Section 2.4.) stores an encrypted string that corresponds to a tuple in relation R. (Note that we could alternatively have chosen to encrypt at the attribute level instead of the row level. Each alternative has its own pros and cons. We point the interested readers to [6] for a detailed description. The rest of this paper assumes encryption is done at the row level.)

Each attribute $A_i^S$ corresponds to the index for the attribute $A_i$ that will be used for query processing at the server. For example, consider a relation emp shown in Table 1 that stores information about employees:

TABLE 1

| eid | ename | salary | addr | did |
|-----|-------|--------|------|-----|
| 23  | Tom   | 70K    | Maple | 40 |
| 860 | Mary  | 60K    | Main  | 80 |
| 320 | John  | 50K    | River | 50 |
| 875 | Jerry | 55K    | Hopewell | 110 |

The emp table is mapped to a corresponding table at the server:

$$\text{emp}^S(\text{etuple}, \text{eid}^S, \text{ename}^S, \text{salary}^S, \text{addr}^S, \text{did}^S)$$

It is only necessary to create an index for attributes involve in search and join predicates. In the above example, if we knew that there would be no query that involves attribute addr in either a selection or a join, then the index on this attribute need not be created. Without loss of generality, we assume that an index is created over each attribute of the relation.

2.1 Partition Functions

We explain what is stored in attribute $A_i^S$ of $R^S$ for each attribute $A_i$ of R. For this purpose, we will need to develop some notations. We first map the domain of values ($D_i$) of attribute $R.A_i$ into partitions $\{p_1, \ldots, p_k\}$, such that (1) these partitions taken together cover the whole domain; and (2) any two partitions do not overlap. Formally, we define a function partition as follows:

$$\text{partition}(R.A_i) = \{p_1, p_2, \ldots, p_k\}$$

As an example, consider the attribute eid of the emp table above. Suppose the values of domain of this attribute lie in the range [0,1000]. Assume that the whole range is divided into 5 partitions: [0,200], (200,400], (400,600], (600,800], and (800,1000]. (Note that it is not necessary to create all of the partitions at the beginning; instead, they can be created as the values are inserted into the database.)

That is:

partition(emp.eid)={[0,200],(200,400],(400,600], (600,800],(800,1000]}

Different attributes may be partitioned using different partition functions. It should be clear that the partition of attribute $A_i$ corresponds to a splitting of its domain into a set of buckets. Any histogram-construction technique, such as MaxDiff, equi-width, or equi-depth [9], could be used to create partitioning of attributes. In the examples used to explain our strategy, for simplicity, we will assume the equi-width partitioning. Extension of our strategy to other partitioning methods is relatively straightforward, though it will require changes to some of the notations developed. For example, unlike equi-width case where a value maps to only a single histogram bin, in equi-depth it may map to multiple buckets. Our notation assumes that each value maps to a single bucket. In the experimental section, besides using the equi-width we will also evaluate our strategy under the equi-depth partitioning.

In the above example, an equi-width histogram was illustrated. Note that when the domain of an attribute corresponds to a field over which ordering is well defined (e.g., the eid attribute), we will assume that a partition $p_i$ is a continuous range. We use $p_i$.low and $p_i$.high to denote the lower and upper boundary of the partition, respectively.

2.2 Identification Functions

Figure 2:
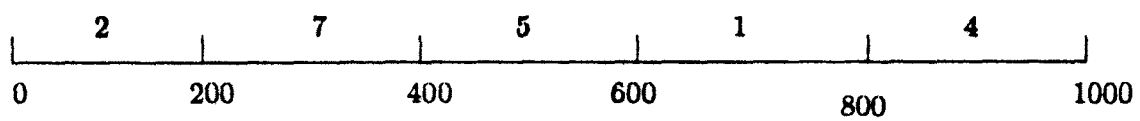
FIG. 2 shows the identifiers assigned to the 5 partitions of the attribute emp.eid.

Furthermore, we define an identification function called ident to assign an identifier $ident_{R.A_i}(p_j)$ to each partition $p_j$ of attribute $A_i$. FIG. 2 shows the identifiers assigned to the 5 partitions of the attribute emp.eid. For instance, $ident_{emp.eid}([0,200])=2$, and $ident_{emp.eid}((800,1000])=4$.

The ident function value for a partition is unique, that is, $ident_{R.A_i}(p_j) \neq ident_{R.A_i}(p_l)$, if $j \neq l$. For this purpose, a collision-free hash function that utilizes properties of the partition may be used as an ident function. For example, in the case where a partition corresponds to a numeric range, the hash function may use the start and/or end values of a range.

2.3 Mapping Functions

Given the above partition and identification functions, we define a mapping function $Map_{R.A_i}$ that maps a value v in the domain of attribute $A_i$ to the identifier of the partition to which v belongs: $Map_{R.A_i}(v) = ident_{R.A_i}(p_j)$, where $p_j$ is the partition that contains v.

In the example above, the following Table 2 shows some values of the mapping function for attribute emp.eid. For instance, $Map_{emp.eid}(23)=2$, $Map_{emp.eid}(860)=4$, and $Map_{emp.eid}(875)=4$.

TABLE 2

| | eid value v | | | |
|---|---|---|---|---|
| | 23 | 860 | 320 | 875 |
| $Map_{emp.eid}(v)$ | 2 | 4 | 7 | 4 |

We further classify two types of mapping functions:

1. Order preserving: A mapping function $Map_{R.A_i}$ is called order preserving if for any two values $v_i$ and $v_j$ in the domain of $A_i$, if $v_i < v_j$, then $Map_{R.A_i}(v_i) \leq Map_{R.A_i}(v_j)$.

2. Random: A mapping function is called random if it is not order preserving.

A random mapping function provides superior privacy compared to its corresponding order-preserving mapping. However, as we will see later, whether a mapping function is order preserving or not affects how we translate a query into queries on the client and server. Query translation is simplified using a order-preserving mapping function. We will develop translation strategies for both types of mapping functions.

We further define three more mapping functions that will help us in translating queries over the encrypted representation. While the first function defined holds over any attribute, the latter two hold for the attributes whose domain values exhibit total order. Application of the mapping function to a value v, greater than the maximum value in the domain, $v_{max}$, returns $Map_{R.A_i}(v_{max})$. Similarly, application of the mapping function to a value v, less than the minimum value in the domain, $v_{mim}$, returns $Map_{R.A_i}(v_{min})$.

Let S be a subset of values in the domain of attribute $A_i$, and v be a value in the domain. We define the following mapping functions on the partitions associated with $A_i$:

$$Map_{R.A_i}(S) = \{ident_{R.A_i}(p_j) | p_j \cap S \neq \emptyset\}$$

$$Map_{R.A_i}^{>}(v) = \{ident_{R.A_i}(p_j) | p_j.low \geq v\}$$

$$Map_{R.A_i}^{<}(v) = \{ident_{R.A_i}(p_j) | p_j.high \leq v\}$$

Essentially, $Map_{R.A_i}(S)$ is the set of identifiers of partitions whose ranges may overlap with the values in S. The result of $Map_{R.A_i}^{>}(v)$ is the set of identifiers corresponding to partitions whose ranges may contain a value not less than v. Likewise, $Map_{R.A_i}^{<}(v)$ is the set of identifiers corresponding to partitions whose ranges may contain a value not greater than v.

2.4 Storing Encrypted Data

We now have enough notations to specify how to store the encrypted relation $R^S$ on the server. For each tuple $t = \langle a_1, a_2, \ldots, a_n \rangle$ in R, the relation $R^S$ stores a tuple:

$$\langle encrypt(\{a_1, a_2, \ldots, a_n\}), Map_{R.A1}(a_1), Map_{R.A2}(a_2), \ldots, Map_{R.An}(a_n) \rangle$$

where encrypt is the function used to encrypt a tuple of the relation. For instance, the following Table 3 is the encrypted relation $emp^S$ stored on the server:

TABLE 3

| etuple | $eid^S$ | $ename^S$ | $salary^S$ | $addr^S$ | $did^S$ |
|---|---|---|---|---|---|
| 1100110011110010 . . . | 2 | 19 | 81 | 18 | 2 |
| 1000000000011101 . . . | 4 | 31 | 59 | 41 | 4 |
| 1111101000010001 . . . | 7 | 7 | 7 | 22 | 2 |
| 1010101010111110 . . . | 4 | 71 | 49 | 22 | 4 |

The first column etuple contains the string corresponding to the encrypted tuples in emp. For instance, the first tuple is encrypted to "1100110011110010 . . . " that is equal to encrypt(23, Tom, 70K, Maple, 40). The second is encrypted to "1000000000011101 . . . " equal to encrypt(860, Mary, 60K, Main, 80). We treat the encryption function as a black box in our discussion. Any block cipher technique such as AES [1], RSA [11], Blowfish [12], DES [3] etc., can be used to encrypt the tuples.

The second column corresponds to the index on the employee ids. For example, value for attribute eid in the first tuple is 23, and its corresponding partition is [0,200]. Since this partition is identified to 2, we store the value "2" as the identifier of the eid for this tuple. Similarly, we store the identifier "4" for the second employee id 860. In the table above, we use different mapping functions for different attributes. The mapping functions for the ename, salary, addr, and did attributes are not shown, but they are assumed to generate the identifiers listed in the table.

In general, we use the notation "E" ("Encrypt") to map a relation R to its encrypted representation. That is, given relation $R(A_1, A_2, \ldots, A_n)$, relation $E(R)$ is $R^S(\text{etuple}, A_1^S, A_2^S, \ldots, A_n^S)$. In the above example, E(emp) is the table $\text{emp}^S$.

2.5 Decryption Functions

Given the operator E that maps a relation to its encrypted representation, we define its inverse operator D that maps the encrypted representation to its corresponding unencrypted representation. That is, $D(R^S)=R$. In the example above, $D(\text{emp}^S)=\text{emp}$. The D operator may also be applied on query expressions. A query expression consists of multiple tables related by arbitrary relational operators (e.g., joins, selections, etc.)

As it will be clear later, the general schema of an encrypted relation or the result of relational operators amongst encrypted relations, $R_i^S$ is:

$$\langle R_1^S.\text{etuple}, R_2^S.\text{etuple}, \ldots, R_1^S.A_1^S, R_1^S.A_2^S, \ldots, R_2^S.A_1^S, R_2^S.A_2^S, \ldots \rangle$$

When the decryption operator D is applied to $R_i^S$, it strips off the index values $(R_1^S.A_1^S, R_1^S.A_2^S, \ldots, R_2^S.A_1^S, R_2^S.A_2^S, \ldots)$ and decrypts $(R_1^S.\text{etuple}, R_2^S.\text{etuple}, \ldots)$ to their unencrypted attribute values.

As an example, assume that another table defined as mgr (mid, did) was also stored in the database. The corresponding encrypted representation E(mgr) will be a table $\text{mgr}^S$ (etuple, $\text{mid}^S$, $\text{did}^S$). Suppose we were to compute a join between tables $\text{emp}^S$ and $\text{mgr}^S$ on their $\text{did}^S$ attributes. The resulting relation $\text{temp}^S$ will contain the attributes $\langle \text{emp}^S.\text{etuple}, \text{eid}^S, \text{ename}^S, \text{salary}^S, \text{addr}^S, \text{emp}^S.\text{did}^S, \text{mgr}^S.\text{etuple}, \text{mid}^S, \text{mgr}^S.\text{did}^S \rangle$. If we are to decrypt the $\text{temp}^S$ relation using the D operator to compute $D(\text{temp}^S)$, the corresponding table will contain the attributes (eid,ename,salary,addr,emp.did,mid,mgr.did)

That is, $D(\text{temp}^S)$ will decrypt all of the encrypted columns in $\text{temp}^S$ and drop the auxiliary columns corresponding to the indices.

3. Mapping Conditions

In this section, we study how to translate specific query conditions in operations (such as selections and joins) to corresponding conditions over the server-side representation. This translation function is called $\text{Map}_{cond}$. Once we know how conditions are translated, we will be ready to discuss how relational operators are translated over the server-side implementation, and how query trees are translated.

For each relation, the server side stores the encrypted tuples, along with the attribute indices determined by their mapping functions. Meanwhile, the client stores the meta data about the specific indices, such as the information about the partitioning of attributes, the mapping functions, etc. The client utilizes this information to translate a given query Q to its server-side representation $Q^S$, which is then executed by the server. We consider query conditions characterized by the following grammar rules:

Condition←Attribute op Value;
Condition←Attribute op Attribute;
Condition←(Condition ∨Condition)|
   (Condition ∧Condition)|(¬ Condition);

Allowed operations for op include $\{=, <, >, \leq, \geq\}$.

In the discussion below we will use the following tables to illustrate the translation.

emp(eid, ename, salary, addr, did, pid)
mgr(mid, did, mname)
proj(pid, pname, did, budget)

Attribute=Value: Such a condition arises in selection operations. The mapping is defined as follows:

$$\text{Map}_{cond}(A_i = v) \Rightarrow A_i^S = \text{Map}_{A_i}(v)$$

As defined in Section 2.3, function $\text{Map}_{A_i}$ maps v to the identifier of $A_i$'s partition that contains with value v. For instance, consider the emp table above, we have:

$$(eid=860) \Rightarrow eid^S=4$$

since eid=860 is mapped to 4 by the mapping function of this attribute.

Attribute <Value: Such a condition arises in selection operations. The attribute must have a well defined ordering over which the "<" operator is defined. Depending upon whether or not the mapping function $\text{Map}_{A_i}$ of the attribute is order-preserving or random, different translations are possible. (Note that we can always use the mapping defined in the random case to translate conditions involving order-preserving attributes. We differentiate between the two cases since the translation (as well as the query processing) is easier for the former case.)

Order preserving: In this case, the translation is straightforward:

$$\text{Map}_{cond}(A_i < v) \Rightarrow A_i^S \leq \text{Map}_{A_i}(v)$$

Random: The translation is a little complex. We check if the attribute value representation $A_i^S$ lies in any of the partitions that may contain a value v' where v'<v. Formally, the translation is:

$$\text{Map}_{cond}(A_i < v) \Rightarrow A_i^S \in \text{Map}_{A_i}^<(v)$$

For instance, the following condition is translated:

$$\text{Map}_{cond}(eid<280) \Rightarrow eid^S \in \{2,7\}$$

since all employee ids less than 280 have two partitions [0,200] and (200,400], whose identifiers are {2,7}.

Attribute >Value: This condition is symmetric with the previous one. As before we differentiate whether or not the mapping function is order preserving. The translation is as follows:

Order preserving:

$$\text{Map}_{cond}(A_i > v) \Rightarrow A_i^S \geq \text{Map}_{A_i}(v);$$

Random:

$$\text{Map}_{cond}(A_i > v) \Rightarrow A_i^S \in \text{Map}_{A_i}^>(v)$$

For instance, the following condition is translated:

$$\text{Map}_{cond}(eid>650) \Rightarrow eid^S \in \{1,4\}$$

since all employee ids greater than 650 are mapped to identifiers: {1,4}

Attribute1=Attribute2: Such a condition might arise in a join. The two attributes can be from two different tables, or from two instances of the same table. The condition can also arise in a selection, and the two attributes can be from the same table. The following is the translation:

$$\text{Map}_{cond}(A_i = A_j) \Rightarrow \bigvee_\varphi \left( A_i^S = ident_{A_i}(p_k) \wedge A_j^S = ident_{A_j}(p_l) \right)$$

where $\phi$ is $p_k \in \text{partition}(A_i)$, $p_l \in \text{partition}(A_j)$, $p_k \cap p_l \neq \emptyset$. That is, we consider all possible pairs of partitions of $A_i$ and $A_j$ that overlap. For each pair $(p_k, p_l)$, we have a condition on the identifiers of these two partitions: $A_i^S = \text{ident}_{A_i}(p_k) \wedge A_j^S = \text{ident}_{A_j}(p_l)$. Finally, we take the disjunction of these conditions. The intuition is that each pair of partitions may provide some values of $A_i$ and $A_j$ that can satisfy the condition $A_i = A_j$.

TABLE 4

| Partitions | Ident$_{emp.did}$ | Partitions | Ident$_{mgr.did}$ |
|---|---|---|---|
| [0, 100] | 2 | [0, 200] | 9 |
| (100, 200] | 4 | (200, 400] | 8 |
| (200, 300] | 3 | | |
| (300, 400] | 1 | | |

For instance, Table 4 above shows the partition and identification functions of two attributes emp.did and mgr.did. Then condition emp.did=mgr.did is translated to the following condition $C_1$:

$$C_1: (\text{emp}^S.\text{did}^S=2 \wedge \text{mgr}^S.\text{did}^S=9) \vee (\text{emp}^S.\text{did}^S=4 \wedge \text{mgr}^S.\text{did}^S=9) \vee (\text{emp}^S.\text{did}^S=3 \wedge \text{mgr}^S.\text{did}^S=8) \vee (\text{emp}^S.\text{did}^S=1 \wedge \text{mgr}^S.\text{did}^S=8)$$

Attribute1<Attribute2: Again such a condition might arise in either a join or in a selection. Let us assume that the condition is $A_i < A_j$. Just as in translating conditions with inequality operator seen previously, the mapping of the condition depends upon whether or not the mapping functions of the attributes $A_i$ and $A_j$ are order preserving or random. We specify the translation for each in turn.

Map$_{A_j}$ is order preserving: In such a case we list out all the partitions of $A_i$ and identify all the partitions of $A_j$ that satisfy the ordering condition. Specifically, the mapping is as follows:

$$\text{Map}_{cond}(A_i < A_j) \Rightarrow \bigvee_{p \in \text{partition}(A_i)} \left(A_i^S = \text{ident}_{A_i}(p) \wedge A_j^S \geq \text{Map}_{A_j}(p.\text{low})\right)$$

Map$_{A_i}$ is order preserving: If $A_i$ is order preserving, we can do the translation in a symmetric way with the roles of $A_i$ and $A_j$ reversed. The mapping will be as follows:

$$\text{Map}_{cond}(A_i < A_j) \Rightarrow \bigvee_{p \in \text{partition}(A_j)} \left(A_j^S = \text{ident}_{A_j}(p) \wedge A_i^S \geq \text{Map}_{A_i}(p.\text{high})\right)$$

Both Map$_{A_i}$ and Map$_{A_j}$ are order preserving: In this case, we have a choice of using either of the above two mappings. Our choice is based on the specific partitioning of $A_i$ and $A_j$. We can do the translation as follows:

$$\text{Map}_{cond}(A_i < A_j) \Rightarrow \bigvee_{\varphi} \left(\text{Map}_{A_i}(p_k.\text{low}) \leq \text{Map}_{A_j}(p_l.\text{high})\right)$$

where $\phi$ is $p_k \in (\text{partition}(A_i))$, $p_l \in \text{partition}(A_j)$.

Both Map$_{A_i}$ and Map$_{A_j}$ are random: We have the following translation:

$$\text{Map}_{cond}(A_i < A_j) \Rightarrow \bigvee_{\varphi} \left(A_i^S = \text{ident}_{A_i}(p_k) \wedge A_j^S = \text{ident}_{A_j}(p_l)\right)$$

where $\phi$ is $p_k \in \text{partition}(A_i)$, $p_l \in \text{partition}(A_j)$, $p_l.\text{high} \geq p_k.\text{low}$. That is, we consider all pairs of partitions of $A_i$ and $A_j$ that could satisfy the condition. For each pair, we have a condition corresponding to the pair of their identifiers. We take the disjunction of these conditions.

For example, condition $C_2$: emp.did<mgr.did is translated to:

$$C_2: \text{emp}^S.\text{did}^S=2 \wedge \text{mgr}^S.\text{did}^S=9) \vee \text{emp}^S.\text{did}^S= 2 \wedge \text{mgr}^S.\text{did}^S=8) \vee \text{emp}^S.\text{did}^S=4 \wedge \text{mgr}^S.\text{did}^S= 9) \vee \text{emp}^S.\text{did}^S=4 \wedge \text{mgr}^S.\text{did}^S=8) \vee \text{emp}^S.\text{did}^S= 3 \wedge \text{mgr}^S.\text{did}^S=8) \vee \text{emp}^S.\text{did}^S=1 \wedge \text{mgr}^S.\text{did}^S=8)$$

Condition emp$^S$.did$^S$=4 $\wedge$ mgr$^S$.did$^S$=9 is included, since partition (100,200] for attribute emp.did and partition (200, 400] for attribute mgr.did can provide pairs of values that satisfy emp.did<mgr.did.

For condition Attribute1>Attribute2, the mapping is same as the mapping of Attribute2<Attribute1, as described above with the roles of the attributes reversed.

Condition1 $\wedge$ Condition2, Condition1 $\vee$ Condition2: The translation of the two composite conditions is given as follows:

$$\text{Map}_{cond}(\text{Condition1} \vee \text{Condition2}) \Rightarrow \text{Map}_{cond}(\text{Condition1}) \vee \text{Map}_{cond}(\text{Condition2})$$

$$\text{Map}_{cond}(\text{Condition1} \wedge \text{Condition2}) \Rightarrow \text{Map}_{cond}(\text{Condition1}) \wedge \text{Map}_{cond}(\text{Condition2})$$

Translation of Map$_{cond}$(¬Condition) treatment is more involved since negated queries are not monotonic and their correct translation requires more notation. This discussion can be found in [5].

Operator $\leq$ follows the same mapping as < and operator $\geq$ follows the same mapping as >. Conditions that involve more than one attribute and operator are not discussed.

4. Implementing Relational Operators Over Encrypted Relations

In this section, we describe how individual relational operators (such as selections, joins, set difference, and grouping operators) can be implemented in the proposed database architecture. Our strategy is to partition the computation of the operators across the client and the server. Specifically, we will attempt to compute a superset of answers generated by the operator using the attribute indices stored at the server. These answers will then be filtered at the client after decryption to generate the true results. We will attempt to minimize the work done at the client as much as possible. Furthermore, we will try to ensure as much as possible that operators executed on the client side are such that they can be applied to the tuples arriving over the answer stream as soon as they arrive (without a need to store them). The purpose is to guarantee that the client-side operators can be efficiently implemented. The implementation of operators developed in this section will be used in the following section, where we develop an algebraic framework for rewriting SQL queries for the purpose of splitting the query computation across the client and the server.

For explaining the implementation of operators, we will consider the following two simplified relations of those in the previous section:

emp(eid, did), mgr(mid, did)

Figure 3:
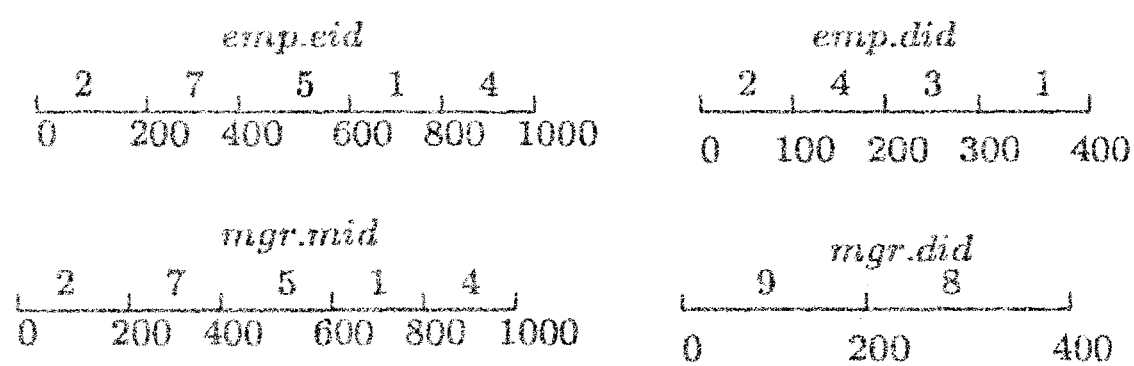
FIG. 3 illustrates that the Map function of mgr.mid is the same as that of emp.eid.
Figure 4:
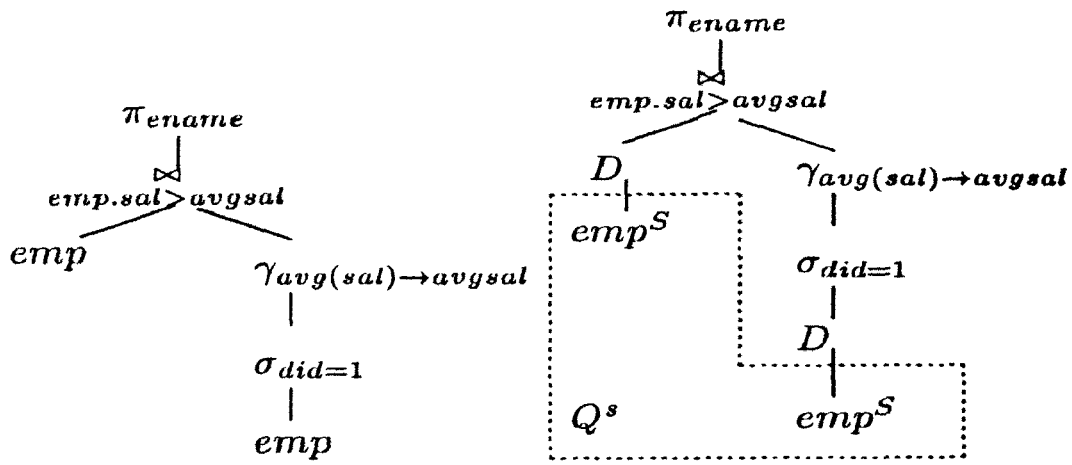
FIGS. 4(a)-(d) illustrate an original query tree, replacing encrypted relations, doing selection at the server, and multiple interactions between the client and server.
Figure 4:
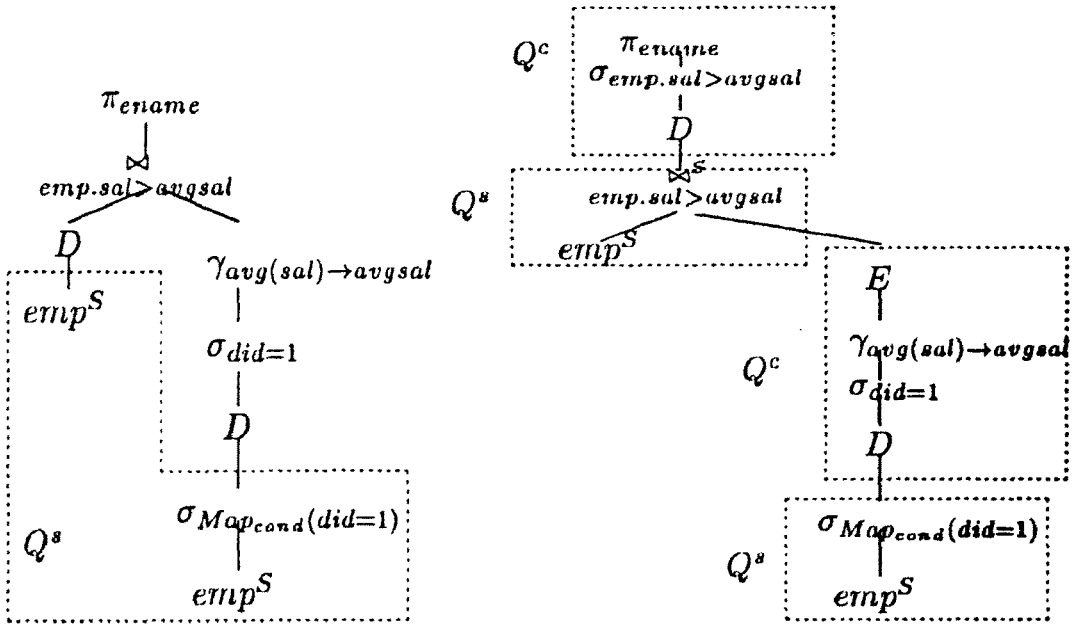

In the previous sections, we have given the Map functions of emp.eid, emp.did, and mgr.did. For simplicity, we assume that the Map function of mgr.mid is the same as that of emp.eid, as shown in FIG. 3. In addition, we use R and T to denote two relations, and use the operator notations in [4].

The Selection Operator ($\sigma$): Consider a selection operation $\sigma_C(R)$ on a relation R, where C is a condition specified on one or more of the attributes $A_1, A_2, \ldots, A_n$ of R. A straightforward implementation of such an operator in our environment is to transmit the relation $R^S$ from the server to the client. Then the client decrypts the result using the D operator, and implements the selection. This strategy, however, pushes the entire work of implementing the selection to the client. In addition, the entire encrypted relation needs to be transmitted from the server to the client. An alternative mechanism is to partially compute the selection operator at the server using the indices associated with the attributes in C, and push the results to the client. The client decrypts the results and filters out tuples that do not satisfy C. Specifically, the operator can be rewritten as follows:

$$\sigma_C(R) = \sigma_C(D(\sigma_{Map_{cond}(C)}^S(R^S)))$$

In the above notation, we adorn the operator that executes at the server with a superscript "S" to highlight the fact that the select operator executes at the server. All non-adorned operators are assumed to execute at the client. The decryption operator D will only keep the attribute etuple of $R^S$, and drop all the other $A_i^S$ attributes. We explain the above implementation using an example $\sigma_{eid<395 \wedge did=140}(emp)$. Based on the definition of $Map_{cond}(C)$ discussed in the previous section, the above selection operation will be translated into $\sigma_C(D(\sigma_{C'}^S(emp^S)))$, where the condition C' on the server is:

$$C' = Map_{cond}(C) = (eid^S \in [2,7] \wedge did^S = 4)$$

The Join Operator ($\bowtie$): Consider a join operation $$R \bowtie_C S.$$

The join condition C could be either equality conditions (in which case the join corresponds to an equijoin), or could be more general conditions (resulting in theta-joins). The above join operation can be implemented as follows:

$$R \bowtie_C T = \sigma_C\left(D\left(R^S \bowtie_{Map_{cond}(C)}^S T^S\right)\right)$$

As before, the S adornment on the join operator emphasizes the fact that the join is to be executed at the server. For instance, join operation $$emp \bowtie_{emp.did=mgr.did} mgr$$

is translated to:

$$\sigma_C\left(D\left(emp^S \bowtie_{C'}^S mgr^S\right)\right)$$

where the condition C' on the server is condition $C_1$ defined in Section 3.

The Grouping and Aggregation Operator ($\gamma$): A grouping and aggregation operation is denoted by $\gamma_L(R)$, where $L = L_G \cup L_A$. $L_G$ refers to a list of attributes on which the grouping is performed, and $L_A$ corresponds to a set of aggregation operations. As an example, the operation $\gamma_{C,COUNT(B) \to F}(R)$ means that we create groups using attribute C of relation R, and for each group compute the count(B) function. That is, $L_G = \{C\}$, and $L_A = \{COUNT(B) \to F\}$. The resulting relation will contain two attributes C and F. A tuple in the result will have an entry for each distinct value of C, and the number of tuples in the group reported as attribute F. If $L_A = \emptyset$, only grouping is performed.

Implementation of the grouping operator $\gamma_L(R)$ can be achieved as follows:

$$\gamma_L(R) = \gamma_L(D(\gamma_{L'}^S(R^S))), \text{ where } L' = \{A_i^S | A_i \in L_G\}$$

That is, the server will group the encrypted tuples based on the attributes of $L_G$. The server does not perform any aggregation corresponding to $L_A$, since it does not have any values for those attributes in $L_A$. The results of $\gamma_{L'}^S$ are returned to the client, which performs the grouping operation $\gamma_L$. This operation can be implemented very efficiently, since every tuple belonging to a single group of $\gamma_L$ will be in a single $\gamma_{L'}^S$ group computed by the server. As a result, the client only needs to consider tuples in a single $\gamma_{L'}^S$ group when computing the groups corresponding to $\gamma_L$. Of course, the aggregation functions specified in $L_A$ will be computed at the client, since their computation requires that tuples be first decrypted.

We explain the implementation using the example below.

$$\gamma_{did,COUNT(eid) \to F}(emp)$$

That is, we want to find the number of employees in each department. Let L denote "did, COUNT(eid)→F." The operation is translated to:

$$\gamma_L(D(\gamma_{did^S}^S(emp^S)))$$

That is, we first do a grouping on the $did^S$ attribute on the server. After the grouped tuples are returned to the client, we decrypt the data, and perform the grouping operation on the did attribute. This step can be done efficiently, since all the tuples with the same did have already been grouped by the server. Finally, we perform the aggregation count(eid) to count the number of employee ids for each did.

The Sorting Operator ($\tau$): A sorting operation $\tau_L(R)$ can be implemented similarly to the grouping operator. That is, we first sort on partition ids at the server. The strategy to implement $\tau_L(R)$ is as follows:

$$\tau_L(R) = \tau_L(D(\gamma_{L'}^S(R^S)))$$

where L'=list of $A_i^S$ corresponding to the $A_i$ in the list L of attributes.

That is, we do a grouping operation $\gamma_{L'}^S$ on the encrypted attributes L' of those in L. If the mapping functions of the attributes in L are all order preserving, this grouping $\gamma_{L'}^S$ operation can be replaced by a corresponding sorting operation $\tau_{L'}^S$. After the results are returned to the client, we call the decryption function D, and perform the $\tau_L$ operation by sorting the tuples on attributes L.

Note that the amount of work done at the client to compute $\tau_L$ in postprocessing depends upon whether or not the attributes listed in L have order-preserving mappings. If the attributes have order-preserving mappings, then the results returned by the server are presorted up to within a partition. Thus, sorting the results is a simple local operation over a single partition. Alternatively, even if the mapping is not order preserving, it is useful to compute $\gamma^S$ at the server to reduce the amount of client work. Since the tuples have been grouped by the server, $\tau_L$ can be implemented efficiently using a merge-sort algorithm.

For example, the sorting operation $\tau_{eid}(emp)$ can be implemented as follows:

$$\tau_{eid}(D(\gamma_{eid}^S(emp^S)))$$

where L={eid}. That is, we first perform a grouping operation $\gamma_{eid}$ on the $emp^S$ relation on the server. The client decrypts the returned tuples, and applies the sorting operation $\tau_{emp}$.

The Duplicate-Elimination Operator ($\delta$): The duplicate-elimination operator $\delta$ is implemented similarly to the grouping operator:

$$\delta(R)=\delta(D(\gamma_L(R^S)))$$

where L=list of all attributes $A_i^S$ where $A_i$ is an attribute in R.

That is, we first group the encrypted tuples on the server using all the attributes in $R^S$. After the results are returned and decrypted at the client, we perform the duplicate elimination operation $\delta$. For example, the operation $\delta(emp)$ is translated to:

$$\delta(D(\gamma_{eid^S,did}^S(emp^S)))$$

The Set Difference Operator (−): Implementation of the difference operation R−T at the server is difficult since, without first decrypting the relations R and T, it is impossible to tell whether or not a given tuple of R also appears in S. However, the indices stored at the server can still be used to meaningfully reduce the amount of work done at the client. In the following we assume that relations R and T are set difference compatible and are defined over attributes $A_1, A_2, \ldots, A_n$ and $B_1, B_2, \ldots, B_n$ respectively. The following rule can be used to implement the set difference operator:

$$R-T=\pi_{R.A_1,\ldots,R.A_n}(R')-\pi_{T.B_1,\ldots,T.B_n}(R')$$

$$R'=D(\gamma_L^S(R^S \sqsupset\!\triangleleft_{Map_{cond}^S(\wedge_{i=1,\ldots,n}(R.A_i=T.B_i))} T^S))$$

where L={$A_1^S, A_2^S, \ldots, A_n^S, B_1^S, B_2^S, \ldots, B_n^S$}.

Once again, the symbol S as a superscript of the left-outer join emphasizes (denoted $\sqsupset\!\triangleleft$) that the operator is implemented on the server side. We illustrate the above rule through an example. Suppose we want to compute emp-mgr, that is, we want to find all the employees who are not managers. The query is translated to the following query:

$$\pi_{emp.eid,emp.did}(R')-\pi_{mgr.mid,mgr.did}(R')$$

$$R'=D(\gamma_{eid^S,emp^S,did^S,mid^S,mgr^S,did}^S(emp^S \sqsupset\!\triangleleft_{C}^S mgr^S))$$

The condition C' is: $Map_{cond}(emp.eid=mgr.mid) \wedge C_1$, where $C_1$ is defined in Section 3. (See Attribute1=Attribute2.)

A few observations about the above implementation of the set-difference operator are noteworthy. First, the grouping of the results based on index attributes is not necessary—that is, the translation would be correct even without the grouping operator. The reason for including the grouping operator is that it can significantly reduce the computation on the client. For example, due to the grouping operator, all the tuples that have a NULL value for $T^S$ attributes will be grouped together. When the resulting tuples of the set difference operator arrive at the client, such tuples can be decrypted and the corresponding R tuple immediately returned as an answer. The reason is that there are no matching tuples of T that could cause the potential elimination of these tuples of R. Hence, the projection and the subsequent set difference implemented on the client side may only be restricted to those tuples for which the corresponding T value is not NULL.

Furthermore, in computing the projection to the attributes of R and S and the subsequent set difference between the two projections we only need to consider a single group formed by $\gamma_L^S$ operator at a time. That is, a T tuple from a different group will not eliminate an R tuple from another group. Thus, performing the grouping at the server side, while not necessary, could significantly reduce the computation at the client.

Second, even with the above optimization, the implementation of the set-difference operator using the outer-join on the server should be used with care. A naive strategy is to transmit the entire relations $R^S$ and $T^S$ to the client, which decrypts them and computes the set difference. This naive strategy might be cheaper than the previous strategy since the size of the outerjoin might be quadratic resulting in high transmission and decryption cost compared to the strategy of transmitting the two relations individually and computing the set difference at the client. Which strategy is used depends upon the content of the relations. Selecting the specific strategy depends upon integrating our framework into a cost-based query optimizer, which is beyond the scope of this paper.

The Union Operator ($\cup$): There are essentially two different union operators based on the bag and the set semantics. The former does not eliminate duplicates, while the latter does. The implementation of the union operator based on bag semantics is straightforward:

$$R \cup T = D(R^S \cup^S T^S)$$

If we wish to compute the union under the set semantics, it can be computed as follows:

$$R \cup T = \delta(D(\tau_L^S(R^S \cup^S T^S)))$$

where L=list of all attributes $A_i^S$ where $A_i$ is an attribute in R.

While the implementation of the union operator on the server side (that is, $\cup^S$) is straightforward, there is one technical challenge that arises. Specifically, since tuples in $R^S \cup^S T^S$ could originate either from $R^S$ or $T^S$, to be able to apply the correct decryption function at the client, as well as to correctly interpret the values in the index attributes of the result at the server, we will store an additional attribute in the result of the union that will determine the origin of the tuple (that is, whether it originates from $R^S$ or $T^S$). Adding such an attribute is crucial for the correct implementation, but we will ignore it in the discussion to keep the algebra simple. The full version of the paper [5] illustrates the need for maintaining the additional attribute and the resulting modifications to the mapping functions and developed algebra.

The Projection Operator ($\pi$): Since each tuple in a relation R is encrypted together into a single string in the etuple attribute of relation $R^S$ at the server, a projection $\pi$ is not implemented at the server. As a result, to compute $\pi_L(R)$, where L is a set of attributes, the strategy is to transmit the complete relation $R^S$ to the client, decrypt the relation at the client, and then compute the projection. That is, $$\pi_L(R)=\pi_L(D(R^S))$$

For instance, we have $\pi_{eid}(emp)=\pi_{eid}(D(emp^S))$.

5. Query Splitting

Given a query Q, our purpose in this section is to develop a strategy to split the computation of Q across the server and the client. The server will use the implementation of the relational operators discussed in the previous section to compute as much of the query as possible, relegating the remainder of the computation to the client. Our objective is to come up with the "best" query plan for Q that minimizes the execution cost. In our setting, the cost of a query consists of many components—the I/O and CPU cost of evaluating the query at the server, the network transmission cost, and the I/O and CPU cost at the client. A variety of possibilities exist. For example, consider the following query over the emp table that retrieves employees whose salary is greater that the average salary of employees in the department identified by did=1.

```
SELECT emp.name FROM emp
WHERE emp.salary > (SELECT AVG(salary)
    FROM emp WHERE did = 1);
```

The corresponding query tree and some of the evaluation strategies are illustrated in FIGS. 4(a) to (d). The first strategy (FIG. 4(b)) is to simply transmit the emp table to the client, which evaluates the query. An alternative strategy (FIG. 4(c)) is to compute part of the inner query at the server, which selects (as many as possible) tuples corresponding to (did=1). The server sends to the client the encrypted version of the emp table, i.e., $emp^S$, along with the encrypted representation of the set of tuples that satisfy the inner query. The client decrypts the tuples to evaluate the remainder of the query. Yet another possibility (FIG. 4(d)) is to evaluate the inner query at the server. That is, select the tuples corresponding to the employees that work in department did=1. The results are shipped to the client, which decrypts the tuples and computes average salary. The average salary is encrypted by the client and shipped back to the server, which then computes the join at the server. Finally, the results are decrypted at the client.

5.1 Heuristic Rules to Separate Queries

It should immediately be obvious that a rich set of possibilities exist in evaluating a query in our framework, and that the decision of the exact query plan should be cost based. This topic, however, is outside the scope of this paper. Our attempt is primarily to establish the feasibility of the proposed model, and cost-based optimization is relegated to future work. Instead, in this section, we will restrict ourselves to a simpler task—we will explore heuristic rules that allow for a given query tree to be split into two parts—the server part (referred to as $Q^S$) that executes at the server first, and the client part (referred to as $Q^C$) that executes at the client based on the results of the query evaluated at the server. Our objective will be to minimize the computation in $Q^C$. That is, we would attempt to rewrite the query tree, such that most of the effort of evaluating the query occurs at the server, and the client does least amount of work.

We illustrate our ideas using examples. As a first example, consider the following query that computes the names of the managers of those employees working on project "diskdrive" whose salary is more than 100K.

```
SELECT mname
FROM emp, mgr, proj
WHERE proj.pname = 'diskdrive'
    AND proj.pid = emp.pid
    AND emp.sal > 100K
    AND emp.did = mgr.did;
```

Figure 5:
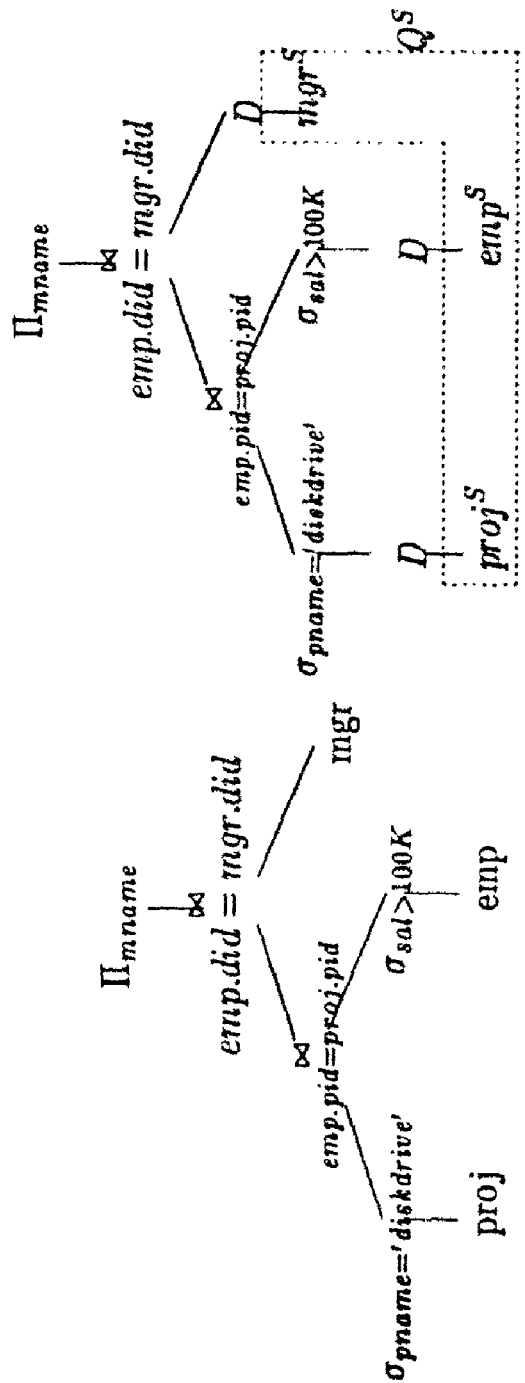
FIGS. 5(a)-(b) illustrate an original query tree, and after replacing with encrypted relations.

The first step is to convert the above query into a corresponding query tree, and to manipulate the query tree to generate a good plan (using the standard query rewrite laws of relational algebra [13]). FIG. 5(a) shows the query tree in which the two selections have been pushed down to relations proj and emp. Since relations are encrypted and stored on the server, we first replace each relation R in the query with encrypted relation $R^S$. The resulting tree is shown in FIG. 5(b).

Figure 6:
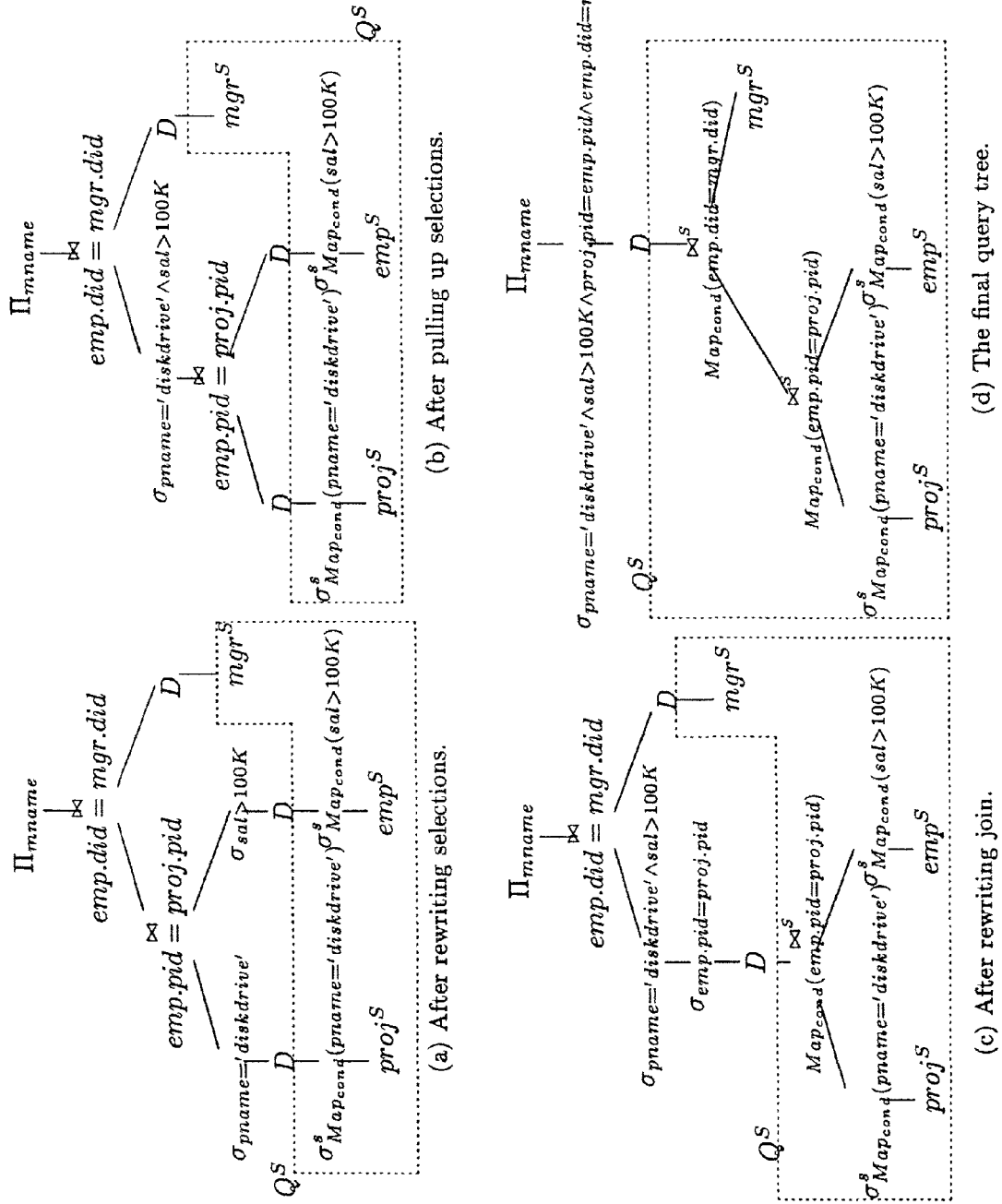
FIGS. 6(a)-(d) illustrate an original query tree after rewriting selections, after pulling selections, after rewriting join; and a final query tree.

As it stands, the current query tree requires the entire relations $proj^S$, $emp^S$, and $mgr^S$ to be sent to the client that will decrypt the relations to evaluate the query. We next replace the selection operations by their implementation listed in the previous section resulting in the query tree shown in FIG. 6(a). Notice that in the corresponding tree, the server is participating in the evaluation of the two selection conditions. Since our objective is to perform as much of the computation at the server as possible, we next pull up the two client-side selection conditions pname='diskdrive' and sal=100K above the join operator $$\bowtie_{emp.pid=proj.pid}$$

using the standard rewrite rules involving selections in relational algebra [13]. The new query tree is shown in FIG. 6(b). We can now rewrite the query tree again using the join implementation discussed in the previous section, such that $$\bowtie_{emp.pid=proj.pid}$$

is executed at the server. FIG. 6(c) shows the query tree after the rewriting. Finally, we pull the two selections $$\sigma_{pname='diskdrive' \wedge sal=100K} \text{ and } \sigma_{emp.pid=proj.pid}$$

above the join operator $$\bowtie_{emp.pid=proj.pid}.$$

Then, we replace the join operator based on the implementation discussed in the previous section, and get the final query tree, as shown FIG. 6(d).

Notice that in the tree of FIG. 6(d), much of the work of query processing is done at the server. The results obtained from the server are decrypted and filtered at the client. Our success in splitting the query Q into the server-side $Q^S$ and client-side $Q^C$ depended on (1) being able to pull the selection operations above other relational operations higher in the query tree; and (2) repeatedly rewriting the higher-level operations using the operator implementations listed in the previous section.

There are situations when the selection operator cannot be pulled up the query tree as it is illustrated in the following example, which uses a set-difference operator. Consider a query that retrieves the set of employees who do not work for the manager named "Bob." The corresponding SQL query is shown below:

```
        SELECT ename
        FROM emp
        WHERE eid NOT IN (SELECT eid
            FROM emp, mgr
            WHERE eid = mid AND ename = 'Bob');
```

Figure 7:
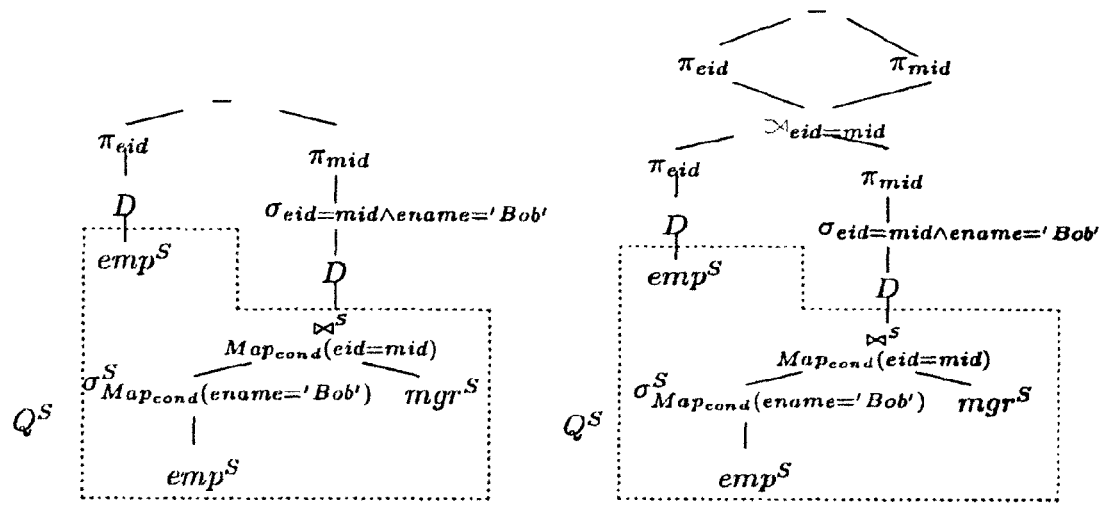
FIGS. 7(a)-(d) illustrate an original query tree with join computation at the server, rewriting a difference operator using outerjoin; after pulling selections and projections, and a final query tree.
Figure 7:
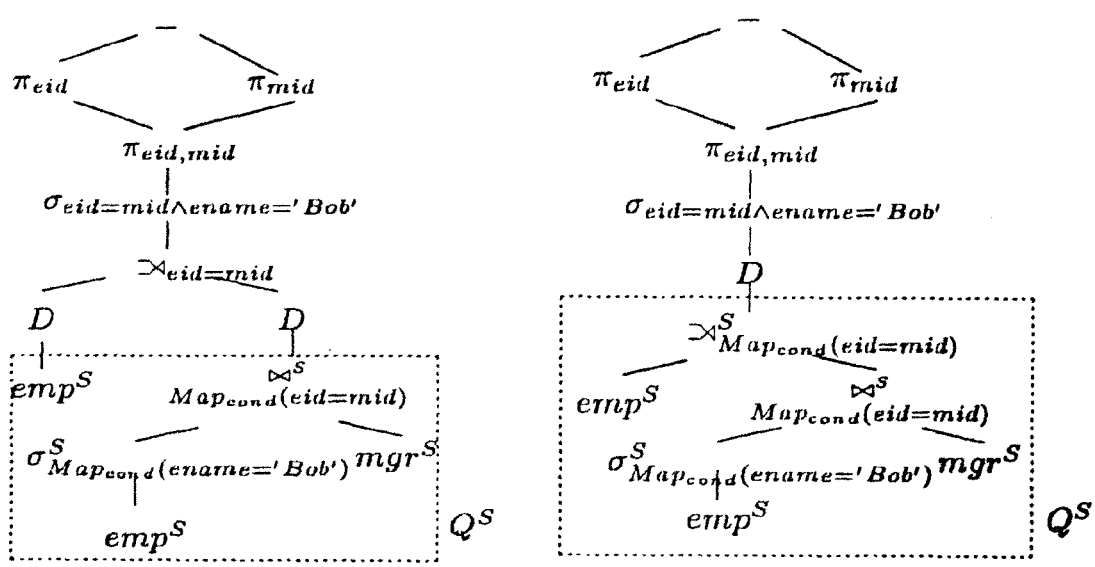

Using the strategy discussed above, we can easily convert the query into the query tree shown in FIG. 7(a). If we are to execute the query plan illustrated in FIG. 7(a), the server will submit to the client the relation emp$^S$, as well as the encrypted answers generated by the $\triangleright\triangleleft^S$ operator. The projections followed by the set-difference operator will be implemented at the client. Notice since the selection and projection operators cannot be pulled above the set-difference operator, it is difficult to apply the implementation of the set-difference operator discussed in the previous section to evaluate the set difference at the server. The trick is to rewrite the set-difference operator using the left-outer join operator $\supset\triangleleft$ (similar to the implementation of set difference discussed in the previous section). Using the rewrite law for set difference, the corresponding tree is modified to the query tree shown in FIG. 7(b). We can now pull the selections and projections above the outer join, resulting in the query tree shown in FIG. 7(c). Finally, this tree can be manipulated using the operator implementation discussed in the previous section, resulting in the final tree shown in FIG. 7(d). The final tree performs much of the query computation at the server, and the results are decrypted and filtered, and the final answer is evaluated at the client.

6. Implementing Aggregation Over Encrypted Relations

This section explores extensions to the general techniques described above in order to support aggregation in a relational database on encrypted data in the presence of logical and textual predicates. Note that 100% of queries in the TPC-H, decision support benchmark, 20% in the TPC-C, OLTP benchmark, and 13.5% in the TPC-W, e-commerce benchmark, require aggregation. Efficient aggregation support is important.

SQL is a large complex language [20]. In order to explain our methods and techniques in limited space, we use a simple but general query form. The specific form of aggregation queries considered further (techniques discussed herein have wider applicability) in the paper is:

```
        SELECT <grouping attributes>,
            <aggregation function>
        FROM <relations>
        WHERE <predicates> GROUP BY <grouping attributes>
```

Here, <aggregation function> refers to any SQL aggregation function (SUM,COUNT,AVG,MIN,MAX) with arithmetic expression as the parameter. <predicates> may include logical comparisons and text matching as supported by SQL's LIKE (NOT LIKE) predicate, between an alphanumeric attribute and text pattern with wildcards.

Our techniques exploit a specialized encryption method, privacy homomorphism (PH for short), that allows basic arithmetic (+, −, ×) over encrypted data. The primary contributions of this paper include: (1) The first application of PH to aggregation queries in relational databases including extensions to make it applicable. (2) Application of a signature based filtering technique to solve the problem of evaluating the SQL LIKE predicate on encrypted textual columns, (3) Formal techniques to transform SQL aggregation queries to execute over encrypted tables including demonstration of cost based optimization opportunities, and (4) performance studies based on a real queries against a real database to validate the ideas.

6.1 Privacy Homomorphism (PH)

Definition of PH: Assume A is the domain of unencrypted values, $E_k$ an encryption function using key k and $D_k$ the corresponding decryption function, i.e., $\forall a \in A, D_k(E_k(a))=a$. Let $\tilde{\alpha}=\{\alpha_1, \alpha_2, \ldots, \alpha_n\}$ and $\tilde{\beta}=\{\beta_1, \beta_2, \ldots, \beta_n\}$ be two (related) function families. The functions in $\tilde{\alpha}$ are defined on the domain A and the functions on $\tilde{\beta}$ are defined on the domain of encrypted values of A. $(E_k, D_k, \tilde{\alpha}, \tilde{\beta})$ is defined as a privacy homomorphism if $D_k(\beta_i(E_k(a_1), E_k(a_2), \ldots, E_k(a_n)))=\alpha_i(a_1, a_2, \ldots, a_n): 1 \leq i \leq n$. Informally, $(E_k, D_k, \tilde{\alpha}, \tilde{\beta})$ is a privacy homomorphism on domain A, if the result of the application of function $\alpha_i$ on values may be obtained by decrypting the result of $\beta_i$ applied to the encrypted form of the same values.

Given the above general definition of PH, we next describe a specific homomorphism proposed in [10] that we will use in the remainder of the paper. We illustrate how the PH can be used to compute basic arithmetic operators through an example.

The key, k=(p, q), where p and q are prime numbers, is chosen by the client who owns the data.

n=p·q, p and q are needed for encryption/decryption and are hidden from the server. n is revealed to the server. The difficulty of factorization forms the basis of encryption.

$E_k(a)=(a \bmod p, a \bmod q)$, where $a \in \mathbb{Z}_n$. We will refer to these two components as the p component and q component, respectively.

$D_k(d_1, d_2)=d_1 qq^{-1}+d_2 pp^{-1} (\bmod n)$, where $d_1=a(\bmod p)$, $d_2=a(\bmod q)$, and $q^{-1}$ is such that $qq^{-1}=1(\bmod p)$ and $p^{-1}$ is such that $pp^{-1}=1(\bmod q)$. (1)

$\tilde{\alpha}=\{+_n, -_n, \times_n\}$, that is addition, subtraction, and multiplication in n.

$\tilde{\beta}=\{+,-,\times\}$, where operations performed componentwise.

We illustrate how PH works through the following example.

Example: Let p=5, q=7. Hence, n=p·q=35, k=(5,7). Assume that the client wants to add $a_1$ and $a_2$, where $a_1$=5, $a_2$=6. $E(a_1)$=(0,5), $E(a_2)$=(1,6) (previously computed) are stored on the server. The server is instructed to compute $E(a_1)+E(a_2)$ componentwise (i.e., without decrypting the data). The computation $E(a_1)+E(a_2)$=(0+1,5+6)=(1,11). The result, (1,11) is returned to the client. The client decrypts (1,11) using the function:

$$(d_1 qq^{-1}+d_2 pp^{-1})(\bmod n)=(1\cdot 7\cdot 3+11\cdot 5\cdot 3)35=186(\bmod 35)$$

which evaluates to 11, the sum of 5 and 6, wherein n is selected in such a way that results always fall in [0,n) (for this example [0,35)). Assume the client wants to multiply 5 and 6. The server would be instructed to perform componentwise multiplication giving us (0,30). (0,30) is sent back to the client, and decrypted as 3035=30, which is the correct answer. The scheme extends to subtraction.

The proof of correctness of decryption uses the Chinese Remainder Theorem, and is found in [38]. We note that for encryption PH relies on the difficulty in factorizing n into its component prime factors p and q. This, in turn, relies on p and q to be very large prime numbers. Thus, for the PH based scheme to be used, the server will need to deal with large number arithmetic. It is, therefore, vital that the proposed strategy be used in conjunction with an efficient large integer arithmetic implementation. There are available efficient software solutions, such as [36,31], which are widely used in many applications. In addition, hardware solutions have also been studied and implemented [29] by using recent technologies such as PAM [40]. Those solutions improve software solutions by order of magnitude [37]. These results are even faster than reported results for a Cray II or a Cyber 170/750 [23].

While hardware techniques overcome the CPU overhead of large number arithmetic, since data is stored on disks, PH increases the storage requirement which would lead to increased I/O cost in the database. For example, a 4 byte integer of the original attribute might be represented as a large 64 byte representation. We have explored two strategies to address this problem. First, we can fragment the encrypted relation into multiple tables such that aggregation attributes are stored separately. This way, the additional overhead is not incurred by queries that do not need to compute aggregations. Additionally, we have developed a technique using which a number of original values of numerical attributes can be packed together to form a large integer value which is then encoded using PH together. For example, instead of storing 64 bytes for each aggregate attribute of the relation, we can utilize the space available to us (i.e., 64 bytes) to pack a number of 4-byte integer values together. The details of the value packing strategy are complex and we do not discuss those further due to space limitations. Instead, we refer the interested reader to [5]. We note that our experiments will show that with these techniques in place, the I/O overhead of using PH is not very significant.

6.2 Extensions to PH

The basic PH scheme above works for modular addition, subtraction, and multiplication of integers only, and needs to be extended in several directions for it to be useful in SQL query processing. SQL arithmetic requires arbitrary expression evaluation using non-modular addition, subtraction, multiplication, and division functions on signed integers and floating point data types. We discuss some of these extensions below (details can be found in [5]).

Division may be supported by leaving the result in fractional form—i.e., by computing the numerator and the denominator of the division separately. For example, if we had to compute $$\frac{a_1}{c_1} + \frac{a_2}{c_2},$$

we could compute the numerator and denominator of the result as $a_1 c_2 + a_2 c_1$ and $c_1 c_2$, respectively. Both only involve addition and multiplication, which are supported by the PH. They could be computed separately and returned to the client which decrypts them and performs the final computation.

Floating point numbers can be handled by exploiting the fact that they are finite precision and can therefore be represented as a fraction.

Negative numbers can be dealt by offsetting the range of numbers. To see the need for this, recall that arithmetic is defined on modulo n in PH. For example, the numbers 33 and −2 are indistinguishable when we represent them in modulo 35. That is, 33 (mod 35)≡−2 (mod 35). Let $v_{min}$ be the smallest negative and $v_{max}$ the largest positive number representable on a machine. We map the range of numbers [$v_{min}$, $v_{max}$] to a new range [0,($v_{max}$−$v_{min}$)], n is chosen to be greater than $v_{max}$−$v_{min}$. A number x is mapped to a shifted value x' in the new range as x'=x−$v_{min}$. After decryption, the client corrects the answer and maps, in a straightforward manner, back to values in the original domain.

Preventing Test for Equality: Picking n such that n>$v_{max}$−$v_{min}$ (as we did above) enables the server to test for equality. Say x and y are two numbers encrypted as ($x_p$, $x_q$) and ($y_p$,$y_q$), respectively. Let z=x*y, which implies in the encrypted domain, ($z_p$,$z_q$)=($x_p$,$x_q$)*($y_p$,$y_q$). The server could start adding ($x_p$,$x_q$) to itself every time checking the equality between the sum and ($z_p$,$z_q$). When the equality is satisfied, the server learns the unencrypted value of y. Thus, $$(z_p, z_q) = \underbrace{(x_p, x_q) + (x_p, x_q) + \ldots + (x_p, x_q)}_{y \text{ times}}$$

We plug this exposure by adding random noise to the encrypted value. We encrypt an original value x as follows; E(x)=(x(mod p)+R(x)·p,x (mod q)+R(x)·q), where R(x) is a pseudorandom number generator with seed x. R(x) value is generated during every insertion/update by the client. This prevents equality testing for the server and the server cannot remove the noise without knowing p and q. The noise is automatically removed at the client upon decryption. In the presence of noise, the following decryption function should be used in place of equation (1) above:

$$D_k(d_1,d_2)=(d_1 \bmod p)qq^{-1}+(d_2 \bmod q)pp^{-1}(\bmod n) \qquad (2)$$

This equation is true because noise had been added in multiples of p for the first and in multiples of q in the second term. The modulo of each p and q term removes the added noise.

Another benefit of introducing noise is that p and q components are no longer stored in modulo p and q, respectively. It makes it additionally difficult for the administrator to guess their values (and hence to break the encryption scheme).

6.3 Aggregation Queries without Selection

Having appropriately extended PH, we now describe mechanisms to compute simple aggregation queries that do not contain any selection conditions (i.e., WHERE clause) over the encrypted domain. We do so in the remainder of this section. Dealing with more complex aggregation queries (with selection) is the topic of Sections 6.5 and 6.6.

Consider an aggregation query that computes the total compensation of employees: that is SUM(salary+commission) from the employee relation. Let employee$^S$ be the encrypted server side representation of an employee relation. The relation is encrypted at the row level by treating a record as a bit string that is encrypted as a unit. employee$^S$, besides storing the resulting ciphertext as a special field, also contains fields salary$_p^h$ and salary$_q^h$ that store the values salary (mod p), and salary (mod q); i.e., together the two fields encode $E^{PH}$(salary), where $E^{PH}$ is a PH used to encrypt salary. Similarly, commission$_p^h$ and commission$_q^h$ fields represent commission using the PH strategy.

The original query can be evaluated by computing the aggregation component-wise at the server using the following query:

```
SELECT SUM( salary_p^h + commission_p^h ) as s1,
       SUM( salary_q^h + commission_q^h ) as s2,
FROM employee^s ;
```

The client can decrypt the result by computing:

$$s1 \bmod p*q^{-1} + s2 \bmod q*p*p^{-1} \pmod n$$

The example captures the intuition underlying our scheme. Two important issues still need to be resolved. First, the aggregation function might be more complex (e.g., ). Arbitrary arithmetic expressions can easily be handled in PH. For the above example, the computation will map to the server side computation as follows:

$$SUM(yearly\_salary_p^h + bonus\_level_p^h * 1000_p),$$

$$SUM(yearly\_salary_q^h + bonus\_level_q^h * 1000_q),$$

where $1000_p$ and $1000_q$ represent p and q components of value 1000, respectively. Secondly, we have so far focussed on the SUM function in the discussion. We explain how other aggregations can be handled below.

6.4 Handling Other Aggregation Functions

We note that COUNT, by itself, does not involve arithmetic and hence does not pose any additional difficulty due to PH. AVG function can be implemented as a combination of SUM and COUNT (namely, SUM/COUNT).

The MIN and MAX functions cannot be directly supported using PH. The PH, which is used for aggregation attributes, does not preserve the order of the original data. It is already established in [10, 28, 29] that if a PH preserves order then it is insecure. Hence, we have devised different mechanisms to compute minimum and maximum values as follows.

We note that, besides supporting logical comparisons, the domain partitioning strategy can also be used to support the MIN and MAX functions. Since the order of the partitions is known to the client as metadata information, the client can exactly identify and request the partition(s) that may contain the minimum and maximum values. After receiving the etuples in the requisite partitions, the client can decrypt and find the exact values of MIN and MAX function by only evaluating within the partitions.

6.5 Selecting Tuples Over Encrypted Data

This section describes mechanisms to select tuples that satisfy conditions specified in the WHERE clause of the query over the encrypted data representation. Specifically, we focus on conditions involving (1) logical comparisons ($<, >, =, \leq, \geq, \neq$), and (2) pattern matching over text attributes, e.g., Mary*.

Testing such conditions directly on encrypted data is difficult—cryptography literature lacks any general solutions. For example, there do not exist any provably secure solutions to test if a given pattern (e.g., '% Mary % M %') appears in encrypted textual data [38]. Likewise, it is difficult to test conditions such as salary >60K directly over the encrypted domain.

To alleviate the problem, we store additional information in the form of an index with the data that enables testing if a tuple satisfies the query condition. The approach could result in false positives—that is, it may identify a superset of the real answer set that will need to be filtered out at the client upon decryption. We discuss these next.

6.5.1 Logical Comparisons

To support logical comparisons ($<, >, =, \leq, \geq, \neq$) over encrypted data, we differentiate between equality and inequality operators. Consider an attribute $A_i$ on which equality test needs to be performed (e.g., as part of a equi-join or selection operation). If we encrypt the attribute value using a deterministic encryption algorithm, such as AES [1], Blowfish [12], DES [3], etc., and store the encrypted field value at the server, equality can be directly tested since $\forall$ domain values $v_i, v_j, v_i = v_j \Leftrightarrow E_k(v_i) = E_k(v_j)$, where $E_k$ is a deterministic encryption algorithm with key k.

For inequality comparisons (e.g., $<,>$) we utilize the strategy proposed in [32]. Consider a relation employee(eid,ename,salary,city,did) an instance of which is shown in Table 5 below.

TABLE 5

| eid | ename | salary | city | did |
|-----|-------|--------|-------|-----|
| 23  | Tom   | 70K    | Maple | 10  |
| 860 | Mary  | 60K    | Maple | 55  |
| 320 | John  | 23K    | River | 35  |
| 875 | Jerry | 45K    | Maple | 58  |
| 870 | John  | 50K    | Maple | 10  |
| 200 | Sarah | 55K    | River | 10  |

Suppose we wish to retrieve eid of employees who make more than 60K. To evaluate conditions such as salary >$60K, a coarse index at the server (that can be used to filter out false positives) is stored. Such a coarse index is derived by first partitioning the domain of salary into a set of partitions (or buckets) over the domain of salary (assumed to be between [0,100K] below). For example:

partition(employee.salary)={[0K,25K],(25K,50K], (50K,75K],(75K,100K]}

Associated with each partition is its identity determined by an identification function ident that could be derived using, for example, a 1-way hashing technique. A particular assignment of identifiers to 4 salary partitions is shown in Table 6 below.

TABLE 6

| employee.salary | |
|---|---|
| Partitions | ID |
| [0, 25K]    | 59 |
| (25K, 50K]  | 49 |
| (50K, 75K]  | 81 |
| (75K, 100K] | 7  |

For instance, $ident_{employee.salary}([0,25K])=59$. A value in the domain can be mapped using the partitioning to its corresponding partition. For example, the salary of Tom in the above table maps to partition 81; that is, $Map_{employee.eid}(70K)=81$. This mapping is used as a coarse index at the server in order to support comparison operators over the encrypted data. For example, to test if a tuple satisfies the condition salary >60K, we can test the condition $salary^{id}=81$ OR $salary^{id}=7$ at the server. If the tuple satisfies the condition, its encrypted representation is returned to the client that can decrypt the results to filter out false positives. We also note that, the strategy allows handling of predicates, which include arithmetic expressions, in WHERE clause [32].

A fundamental question is how should the domain be partitioned and into how many partitions. The choices may have both performance and privacy implications. We point the interested reader to [32] that considers and experiments various partitioning strategies (e.g., equi-width, equi-depth) for this purpose.

6.6 Pattern Matching Conditions

For a given attribute of string type (e.g., ename), we propose that the client associates a set of n-grams denoted by N, where an n-gram is a consecutive sequence of characters of arbitrary length. Based on the set of n-grams, each attribute value (string) is represented at the server by a signature that contains a bit per n-gram in N (using an inverted list is an alternative). For example, given N={go,ry,M}, ename attribute value "Mary" of the second record in Table 1 will be represented using a signature "011" since the n-gram ry and M are found in "Mary" but go is not. Thus, in the encrypted representation of the relation, for each string type on which LIKE queries need to be supported, we add a new attribute that stores the signature for the string.

The client maintains the list of selected n-grams. Given a query, the client determines the signature values for the query string mentioned in the LIKE predicate. For example, for N={go,ry,M}, the query string "% Mary % M %" will be converted into the corresponding signature "011" OR "111" (boolean minimization techniques are applicable) since ry and M are contained in "% Mary % M %" and go is not. Using the query signature, a (superset) of tuples that match the query pattern can be identified at the server which can be filtered at the client after decryption.

Similar to domain partitioning strategies, the choice of the set of s could significantly impact the text query performance and security guarantees. From a performance perspective, one desires a set of s that minimize false positives for pattern queries. Optimal selection has been recently studied for document indexing [24]. However, unlike their work, our problem setting is different and imposes different design concerns. First, since clients may have limited storage or processing capability, we require that the number and size of n-grams be limited. Further, n-grams creation should not involve expensive passes over the large databases stored at the server. This would require the client to transfer the data from the server, decrypt and process it to compute the n-grams. Finally, the choice of n-grams used to index the text field should not compromise data privacy.

We followed a very simple gram selection policy that randomly selected n-grams out of the set of all feasible after appropriately biasing the selection process to choose, for any size k, grams with equal probability by factoring their different cardinalities. That is, our selection process ensured that the probabilities of selecting n-grams of length 1,2, ..., m: $1 \leq m \leq k$ are equal.

6.6 Query Processing Over Encrypted Data

Having developed basic methods to compute aggregations, compare values, and support pattern queries, we now turn our attention to techniques to evaluate SQL queries over encrypted data. We begin by first formally specifying how relational data is stored at the server. We will then discuss techniques to map a query into the server side representation.

6.6.1 Storage Model

Let R be a relation with the set of attributes $\tilde{R}=\{r_1,\ldots,r_n\}$. R is represented at the server as an encrypted relation $R^S$ that contains an attribute etuple= $\langle E'(r_1, r_2, \ldots, r_n) \rangle$, where E' is the function used to encrypt a row of the relation R. $R^S$ also (optionally) stores other attributes based on the following classification of the attributes of R:

Aggregation attributes ($A_j \in \tilde{R}: 1 \leq j \leq j' \leq n$): are attributes of R on which we expect to do aggregation. For each $A_j$, $R^S$ contains an attribute $A_j^h$ that represents the encrypted form of corresponding original attribute $A_j$ with PH, thus $A_j^h = E^{PH}(A^j)$, where $E^{PH}$ is a PH.

String attributes ($W_t \in \tilde{R}: 1 \leq t \leq t' \leq n$): are text attributes in R on which LIKE queries might be defined. For each $W_t$, $R^S$ contains an attribute $W_t^g$ that stores the (bit string) signature value of corresponding original attribute $W_t$.

Field level encrypted attributes ($F_k \in \tilde{R}: 1 \leq k \leq k' \leq n$): are attributes in R on which equality selections, equijoins, and grouping might be performed. For each $F_k$, $R^S$ contains an attribute $F_k^f = E^f(F_k^f)$, where $E^f$ is a deterministic encryption used to encode the value of the field $F_k$.

Partitioning attributes ($P_m \in \tilde{R}: 1 \leq m \leq m' \leq n$): are attributes of R on which general selections or joins (other than equality) might be performed. For each $P_m$, $R^S$ contains an attribute $P_m^{id}$ that stores the partition index of the base attribute values, thus $P_m^{id} = \text{Map}_{R.P_m}(P_m)$.

Embedded attributes ($EM_l \in \tilde{R}: 1 \leq l \leq l' \leq n$): are attributes in $\tilde{R}$ that are not in any of the above four categories. These attributes are, most likely, not accessed individually by queries for either selections, group creation, or aggregation. They need not be encrypted separately. Their values can be recovered after the decryption operation on the encrypted row (i.e., etuple) is executed on the client site.

Given the above attribute classification, the schema for the relation $R^S$ is as follows:

$$R^S(\text{etuple}, P_1^{id}, \ldots, P_m^{id}, F_1^f, \ldots, F_k^f, W_1^g, \ldots, W_t^g, A_1^h, \ldots, A_j^h)$$

Table 7 shows a possible instance of the server side representation of the employee relation given in Table 5.

TABLE 7

| etuple (encrypted tuple) | eid$^{id}$ | salary$^{id}$ | city$^{id}$ | did$^{id}$ | city$^f$ | did$^f$ | ename$^g$ | salary$^h_p$ | salary$^h_q$ |
|---|---|---|---|---|---|---|---|---|---|
| =*? Ew@R*((<<=+,- ... | 2 | 81 | 18 | 2 | ? Ew ... | @R* ... | 101 ... | 7 | 27 |
| b*((<<(*? Ew@=l,r ... | 4 | 81 | 18 | 3 | ? Ew ... | =+, ... | 001 ... | 18 | 17 |
| w@=W*((<<(*? E: ,j ... | 7 | 59 | 22 | 4 | <(* ... | <(* ... | 010 ... | 2 | 23 |
| <(* @=W*((<? E;,r ... | 4 | 49 | 18 | 3 | ? Ew ... | E:, ... | 110 ... | 3 | 2 |
| *(<(* @=U(<S? /,6 ... | 4 | 49 | 18 | 2 | ? Ew ... | @R* ... | 110 ... | 8 | 7 |
| ffTi* @=U(<? G+,a ... | 7 | 49 | 22 | 2 | <(* ... | @R* ... | 110 ... | 13 | 12 | salary$^h$ spans salary$^h_p$ and salary$^h_q$.

In the mapping, we assumed that partitioning attributes are {eid,salary,city,did}, field level encrypted attributes are {city, did}, string attributes are {ename}, and aggregation attributes are {salary}.

Note that for a relation, the categories may overlap. For example, if an attribute is expected to be used for both selection and aggregation, we might represent it as both an aggregation and partitioning attribute. Similarly, an attribute may be represented both as a partitioning and a field-level encrypted attribute—the latter will facilitate efficient evaluation of equi-join or equality selection queries, whereas, the former will support other general queries. This allows flexibility to the model and enables customization of the system for specific performance, security, and storage requirements.

6.7 Aggregation Approach Query Overview

Given a query Q, our problem is to decompose the query to an appropriate query $Q^S$ on the encrypted relations $R^S$ such that results of $Q^S$ can be filtered at the client in order to compute the results of Q. Ideally, we would like $Q^S$ to perform bulk of the work of processing Q. The effectiveness of the decomposition depends upon the specifics of the conditions involved in Q and on the server side representation $R^S$ of the relations involved. Consider, for example, a query to retrieve sum of salaries of employee in did=40. If did is a field-level encrypted field (as is the case in our example), the server can exactly identify records that satisfy the condition by utilizing the equality between the client-supplied values and the encrypted values stored on the server. In such a case, aggregation can be fully performed on the salary attribute of the selected tuples exploiting the PH representation. If, on the other hand, the condition was more complex, (e.g., did >35 AND did <40), such a query will be mapped to the server side by mapping the did to the corresponding partitions associated with the did field that cover the range of values from 35 to 40. Since the tuples satisfying the server side query may be a superset of actual answer, aggregation cannot be completely performed at the server. Our strategy is to separate the qualified records into those that certainly satisfy the query conditions, and those that may satisfy it—the former can be aggregated at the server, while the latter will need to be transmitted to the client, which on decrypting, can filter out those that do not, and aggregate the rest. The strategy suggests a natural partitioning of the server side query $Q^S$ into two queries $Q_c^S$ and $Q_m^S$ as follows:

Certain Query ($Q_c^S$): that selects tuples that certainly qualify the conditions associated with Q. Results of $Q_c^S$ can be aggregated at the server.

Maybe Query ($Q_m^S$): that selects etuples corresponding to records that may qualify the conditions of Q but it cannot be determined for sure without decrypting. The client decrypts these etuples, and then selects the ones that actually qualify and performs the rest of the query processing.

To finalize the computation, the client combines results from these queries to reach the actual answers. We next discuss how a client side query Q is translated into the two server side representations $Q_c^S$ and $Q_m^S$.

6.7 Query Translation

The principal issue in decomposing the query Q into its server side representations $Q_c^S$ and $Q_m^S$ is to map the conditions specified in Q to corresponding conditions on the server side representation. We first consider how an individual condition $C_k$ of Q is mapped. Our mapping function $Map_{cond}(C_k)$ consists of two components: $Map_{cond}^c(C_k)$ and $Map_{cond}^m(C_k)$. $Map_{cond}^c(C_k)$ maps $C_k$ to a server side condition such that every tuple satisfying $Map_{cond}^c(C_k)$ certainly satisfies $C_k$, while $Map_{cond}^m(C_k)$ maps $C_k$ into a condition that qualifies tuples that maybe satisfies $C_k$. Together, the two conditions identify (a superset of) tuples that satisfy the original condition $C_k$. Naturally, $Map_{cond}(C_k)=Map_{cond}^c(C_k) \vee Map_{cond}^m(C_k)$. We will use the following notation to describe how conditions in the original query are mapped to their server side representation.

Let R be a relation, $R.A_i$ be a partitioning attribute of R, let $\{p_1, p_2, \ldots, p_n\}$ be the set of partitions associated with $R.A_i$, and v be a value in the domain of $R.A_i$. We define the following mapping functions on the partitions associated with $A_i$:

$$Map_{R.A_i}^{>}(v)=\{ident_{R.A_i}(p_k) | p_k.low \geq v\}, \text{ and}$$

$$Map_{R.A_i}^{<}(v)=\{ident_{R.A_i}(p_k) | p_k.high \leq v\},$$

where $p_k.low$ and $p_k.high$ are the low and high ranges associated with the partition.

6.7.1 Mapping Conditions

Attribute=Value: We can evaluate the condition by testing equality between the field level encrypted values of the attribute $A_i$ and the value v given in the condition, i.e., $A_i^f=E_k(v)$. The result is exactly the set of records that satisfy the condition since, for deterministic encryption, $A_i^f=E_k(A_i)$ and $A_i=v \Leftrightarrow E_k(A_i)=E_k(v)$ Thus, $$Map_{cond}(A_i=v)=Map_{cond}^c(A_i=v)\equiv A_i^f=E(v)$$

For instance, consider the employee table, and mapping of the following condition:

$$Map_{cond}(\text{salary}=84K)=Map_{cond}^c(\text{salary}=84K)$$
$$=\text{employee}^S.\text{salary}^f=E(84K)$$

Attribute <Value: We utilize partitioning attributes to map the condition. Since the query condition may fully contain some of the partitions and partially overlap with the others, $Map_{cond}$ function will have both components $Map_{cond}^c$ and $Map_{cond}^m$.

$$Map_{cond}(A_i < v) \equiv Map_{cond}^c(A_i < v) \vee Map_{cond}^m(A_i < v)$$

$$Map_{cond}^c(A_i < v) \equiv \bigvee_{p_j \in P_{C_k} \wedge p_j.high < v} A_i^{id}=ident(p_j)$$

$$Map_{cond}^m(A_i < v) \equiv \bigvee_{p_j \in P_{C_k} \wedge p_l.low \leq v \wedge p_l.high \geq v} A_i^{id}=ident(p_l)$$

where $P_{C_k}=\{p_t | p_t \in Map_{A_i}^{<}(v)\}$

Consider the mapping of the following condition as an example:

$$Map_{cond}(\text{salary}<60K)=Map_{cond}^c(\text{salary}<60K) \vee Map_{cond}^m(\text{salary}<60K)$$

$$Map_{cond}^c(\text{salary}<60K)=\text{salary}^{id}=59 \vee \text{salary}^{id}=49$$

$$Map_{cond}^m(A_i<v)=\text{salary}^{id}=81$$

since salary <60K condition fully overlaps with [0K, 25K] identified by 59 and (25K, 50K] identified by 49, and it partial overlaps with [50K, 75K] identified by 81.

Attribute1=Attribute2: For this case, we again exploit the field level encrypted attributes of encrypted relation. We can test the equality of two attribute values directly over their encrypted values, as $A_i=A_j \Leftrightarrow E_k(A_i)=E_k(A_j)$ due to deterministic encryption. (We make an assumption that the same key is used to encrypt the attributes $A_i$ and $A_j$). As a result, $Map_{cond}$ includes only $Map_{cond}^c$ component for this type of condition. Thus, this type of conditions may be evaluated completely on the server.

$$Map_{cond}(A_i=A_j)=Map_{cond}^c(A_i=A_j)\equiv A_i^f=A_j^f$$

For example:

$$Map_{cond}(employee.did = manager.did) \equiv$$
$$Map_{cond}^c(employee.did = manager.did) \equiv$$
$$employee.did^f = manager.did^f$$

Attribute1<Attribute2: To evaluate the condition, we need to test the order of the values of two attributes mentioned in the condition. Since the encryption algorithms, which may be used for field level encrypted attributes and for aggregation attributes do not preserve the order of the original data, they may not be used for the test. Therefore, we use partitioning attributes to evaluate the condition.

The condition is mapped by considering all pairs of partitions of $A_i$ and $A_j$ that could satisfy the condition. The pairs that have overlap (either fully or partially) are subject to $Map_{cond}^m$ function. The other pairs, which do not overlap while satisfying the condition, are subject to $Map_{cond}^c$ function. Formally, the mapping is defined as follows:

$$Map_{cond}(A_i < A_j) \equiv Map_{cond}^c(A_i < A_j) \vee Map_{cond}^m(A_i < A_j)$$

$$Map_{cond}^c(A_i < A_j) \equiv \bigvee_{\varphi} \left(A_i^{id} = ident_{A_i}(p_m) \wedge A_j^{id} = ident_{A_j}(p_n)\right)$$

$$Map_{cond}^m(A_i < A_j) \equiv \bigvee_{\gamma} \left(A_i^{id} = ident_{A_i}(p_k) \wedge A_j^{id} = ident_{A_j}(p_l)\right)$$

where $\phi$ is $p_m \in partition(A_i)$, $p_n \in partition(A_j)$, $p_n.low > p_m.high$ and $\gamma$ is $p_k \in partition(A_i)$, $p_l \in partition(A_j)$, $p_l.low < p_k.high$

TABLE 8

| Attribute: employee.did | | Attribute: manager.did | |
| --- | --- | --- | --- |
| Partitions | Partition IDs | Partitions | Parition IDs |
| [0, 20] | 2 | [0, 30] | 21 |
| (20, 40] | 4 | (30, 45] | 34 |
| (40, 60] | 3 | (45, 60] | 56 |

Consider the partitioning schema for two attributes in Table 8 above and the following condition to be mapped:

$Map_{cond}$(employee.did<manager.did)=$Map_{cond}^c$
(employee.did<manager.did) $\vee Map_{cond}^m$
(employee.did<manager.did)

where:

$Map_{cond}^c$(employee.did<manager.did)≡(employee$^S$.did$^{id}$=2
$\vee$manager$^S$.did$^{id}$=34) $\vee$(employee$^S$.did$^{id}$=2
$\vee$manager$^S$.did$^{id}$=56) $\vee$(employee$^S$.did$^{id}$=4
$\vee$manager$^S$.did$^{id}$=56)

and:

$Map_{cond}^m$(employee.did<manager.did)=
(employee$^S$.did$^{id}$=2 $\wedge$manager$^S$.did$^{id}$=
21) $\vee$(employee$^S$.did$^{id}$=4 $\wedge$manager$^S$.did$^{id}$=
56) $\vee$(employee$^S$.did$^{id}$=4 $\wedge$manager$^S$.did$^{id}$=
34) $\vee$(employee$^S$.did$^{id}$=3 $\wedge$manager$^S$.did$^{id}$=56)

Attribute LIKE '% query_string %': In this case, we make use of string signatures to evaluate the condition. First, we determine the signature values for the query string mentioned in the LIKE predicate and construct the query bit vector. This bit vector replaces the query string in the mapped condition. Wildcards are handled in a straightforward manner [24]. Formally, $Map_{cond}(A_i$ LIKE $q)$=$Map_{cond}^m(A_i$ LIKE $q)$≡$A_i^g = G(q)$ where q is query string and $G(\cdot)$ is signature generator function, which generates a bit vector $\vec{b}=\{b_1, \ldots, b_n\}$, where $b_i \in \{0,1\}: 1 \leq i \leq |N|$ and $N=\{g_1, \ldots, g_n\}$ is given set of preselected n-grams. Thus, $G(q)= \vec{b} =\{b_1, \ldots, b_n\}$, where $b_i=1$, if $g_i$ is a substring of q; $b_i=0$ otherwise.

For brevity we skip the discussion on how other atomic conditions involving operations $>$, $\leq$, $\geq$ are mapped. We note that the mapping for operator $>$ is symmetric to that of $<$. Similarly, operator $\leq$ follows the same mapping as $<$ and operator $\geq$ that of $>$. Mapping composite conditions, i.e., conjunction and disjunction of atomic conditions, is trivial [5].

6.7.2 Query Decomposition

Once all conditions are translated according the mappings given above, we need to identify the parts of the conditions that will be evaluated by $Q_c^S$ and the remaining part that will be evaluated by $Q_m^S$. This also will represent separation of those two queries. To separate the conditions, we first map each condition by using mapping functions given above. Then, we convert the resulting conditions into disjunctive normal form (DNF) and split the disjuncts into two classes:

Certain disjuncts: These are the disjuncts that contain only $Map_{cond}^c$ functions. Note that tuples satisfying these disjuncts certainly satisfy the conditions associated of the original query Q.

Maybe disjuncts: These disjuncts contain $Map_{cond}^c$ functions (they may also contain $Map_{cond}^c$ functions). Tuples that satisfy these disjuncts may or may not satisfy the conditions specified with the original query Q.

The above classification suggests a natural splitting of the server side query into two parts: $Q_c^S$ and $Q_m^S \cdot Q_c^S$ is formed with the first class of the disjuncts, which only contain functions and $Q_m^S$ is formed with the second class of disjuncts, which contain functions. Algorithmic steps of this procedure are given below:

Input: Composite condition W of original query Q
1. For each atomic condition $C_i$ in W
Compute mapped condition $C_i'$:
$Map_{cond}(C_i)$≡$Map_{cond}^c(C_i) \vee Map_{cond}^m(C_i)$
2. Build mapped composite condition W' with $C_i$'s
3. Convert W' into DNF
4. Define $D_c$ as set of disjuncts having only $Map_{cond}^c$
5. Define $D_m$ as set of disjuncts having only $Map_{cond}^m$
6. Form query $Q_c^S$ with $D_c$ in WHERE clause
7. Form query $Q_m^S$ with $D_m$ in WHERE clause For $Q_c^S$, the GROUP BY attributes in the SELECT clause are replaced by their field-level encrypted attributes and the aggregation is replaced with the corresponding aggregation over the PH representation of the attribute. The result of $Q_c^S$ will be the encrypted representation of the group value along with the PH encrypted value of the corresponding aggregation. The client can decrypt the group values and the encrypted aggregations. For $Q_m^S$, the SELECT clause is replaced by the selection etuples that will be sent to the client. The client will need to decrypt the etuples to determine those that satisfy the conditions associated with query Q. Subsequently, it will perform the corresponding GROUP BY and aggregations.

The client can determine the final result of the aggregation query by merging the results of the individual computations of the two queries. The mechanism to merge the results of the two queries depends upon the specific aggregation function associated with the query. For the SUM and COUNT queries the result can be obtained by adding the result of the two queries. For MIN and MAX, the result can be obtained by computing the minimum and the maximum of the results of the two queries respectively. For AVG, each query needs to return the SUM and the COUNT separately which can then be used to determine the overall aggregate value.

6.8 EXAMPLE

In this section, we explain our strategy by walking through the steps of the query translation discussed above using an example query over the employee and manager tables. Sample population of employee table is given in Table 1 and partitioning scheme of salary attribute of employee is given in Table 2. Consider the following query, which has composite condition W: city='Maple' ∧salary <65K ∧emp.did=mgr.did consists of three atomic conditions, namely, $C_1$: city='Maple', $C_2$: salary <65K, $C_3$: emp.did=mgr.did;

SELECT SUM(salary)
FROM employee, manager
WHERE city='Maple' AND salary <65K AND emp.did=mgr.did Let us now generate the server side representation of the original query by following the algorithm steps provided above.

1. We first map each atomic condition by identifying $\text{Map}_{cond}^c$ and $\text{Map}_{cond}^m$ parts. Hence, the conditions are mapped as follows:

$C_1$: $\text{Map}_{cond}$(city='Maple')=$\text{Map}_{cond}^c$(city='Maple')=city$^f$=E('Maple')

$C_2$: $\text{Map}_{cond}$(salary<65K)=$\text{Map}_{cond}^c$(salary<65K) ∨$\text{Map}_{cond}^m$(salary<65K)

$\text{Map}_{cond}^c$(salary<65K)=salary$^{id}$=49 ∨salary$^{id}$=59

$\text{Map}_{cond}^m$(salary<65K)=salary$^{id}$=81

$C_3$: $\text{Map}_{cond}$(emp.did=mgr.did)=$\text{Map}_{cond}^c$(emp.did=mgr.did)=emp.did$^f$=mgr.did$^f$ 2. Thus, mapped composite condition W' is formed as:

W': city$^f$=E('maple') ∧(salary$^{id}$=49 ∨salary$^{id}$=59 ∨salary$^{id}$=81) ∧emp.did$^f$=mgr.did$^f$ 3. Now we can convert W1 into DNF:

$$\underbrace{city^f = E(\text{'Maple'})}_{Map^c_{cond}(C_1)} \wedge \underbrace{salary^{id} = 49}_{Map^c_{cond}(C_2)} \wedge \underbrace{emp.did^f = mgr.did^f}_{Map^c_{cond}(C_3)} (D_1)$$

$$\vee \underbrace{city^f = E(\text{'Maple'})}_{Map^c_{cond}(C_1)} \wedge \underbrace{salary^{id} = 59}_{Map^c_{cond}(C_2)} \wedge \underbrace{emp.did^f = mgr.did^f}_{Map^c_{cond}(C_3)} (D_2)$$

$$\vee \underbrace{city^f = E(\text{'Maple'})}_{Map^c_{cond}(C_1)} \wedge \underbrace{salary^{id} = 81}_{Map^m_{cond}(C_2)} \wedge \underbrace{emp.did^f = mgr.did^f}_{Map^c_{cond}(C_3)} (D_3)$$

We put curly braces to show the class, whether they are $\text{Map}_{cond}^c$ or $\text{Map}_{cond}^m$, of the mapped conditions and label them with the disjunct labels, $D_1$, $D_2$, $D_3$. This information is used to in the next step, where we define $D^c$ and $D^m$ sets.

4. From the previous step, the set $D^c$, only having $\text{Map}_{cond}^c$, is defined as $\{D_1, D_2\}$.

5. The set $D^m$, having $\text{Map}_{cond}^m$, is defined as $\{D_3\}$.

Now, we can form the server side representation of the original query by forming two queries: $Q_c^S$ and $Q_m^S$ as follows:

6. $Q_c^S$:

---

SELECT SUM$^{PH}$ (salary$^h$)
FROM employee$^S$, manager$^S$
WHERE city$^f$ = E('Maple') AND
(salary$^{id}$ = 49) OR
(salary$^{id}$ = 59) AND
emp.did$^f$ = mgr.did$^f$

---

7. $Q_m^S$:

---

SELECT employee$^S$.etuple, manager$^S$.etuple
FROM employee$^S$, manager$^S$
WHERE city$^f$ = E('Maple') AND
(salary$^{id}$ = 81) AND
emp.did$^f$ = mgr.did$^f$

---

$Q_c^S$ evaluates and returns the aggregation, SUM(salary), on encrypted relation by exploiting the PH. $Q_m^S$ selects tuples which may satisfy the original query condition (but the server cannot determine if they do). In our example, these correspond to the first two tuples of the employees relation (see Table 7). The query returns the corresponding etuples to the client. Upon decryption, the client can figure that, the first tuple (which has salary=70K) does not satisfy the query and should be eliminated. The second tuple, however, which has salary=60K, satisfies the query condition and should be taken into account. The client finalizes the computation by combining the answer returned by the first query, $Q_c^S$, and those condition-satisfying tuples returned by the second query, $Q_m^S$.

6.9 Reducing the Maybe Set

In our framework, so far, a server side aggregation query $Q^S$ is split in two: $Q_c^S$ and $Q_m^S$ whose results form the certain and maybe answer sets, respectively. While results of $Q_c^S$ can be aggregated at the server, results of $Q_m^S$ are shipped to the client, where they are decrypted, and combined with the aggregation over results of $Q_c^S$. In the DAS model, our primary concern is to minimize the client-side post processing overhead. The dominant client-side costs include the cost of decrypting and filtering results both of which are proportional to number of records returned by the server for final processing (i.e., the size of the maybe set). Therefore, large increases in the size of maybe set (e.g., presence of pattern matching predicates) would cause increasing overhead at the client. In this section, we explore further opportunities to reduce the client side cost by minimizing the records returned by the server to the client. This is achieved by selectively choosing a subset of selection operations in the query to remove uncertainty in their maybe sets in order to minimize the overall cost of the query. We illustrate our ideas through an example. Let us consider the following query:

---

SELECT SUM(sale)
FROM employee as T1, sales as T2
WHERE T1.eid = T2.eid
AND T1.salary < 90K AND T2.date > '1-1-2002'

---

Let us assume that after the rewrite, based on the metadata stored at the client, $Q^S$ is given as follows:

---

SELECT SUM(sale_p), SUM(sale_q)
FROM enc_employee as e_T1, enc_sales as e_T2
WHERE e_T1.eid = e_T2.eid AND
e_T1.s_id IN (3,4,5) AND
e_T2.d_id IN (17,18,19)

---

Further, let us assume that partitions {3,4} are fully overlapped and partition {5} is partially overlapped with T1.salary <90K condition. Similarly, partitions {17,18} are fully overlapped and partition {19} is partially overlapped with T2.date>'1-1-2002' condition. As the part of metadata the client maintains the number of records in each of the buckets. From that information, assume the number of records in each bucket is given as follows; for employee.salary attribute: |3|=100, |4|=100, and |5|=10, and for sales.date attribute: |17|=1000, |18|=1000, and |19|=1000. Let employee.eid be the primary key of employee table and the number of distinct eid values in the buckets {17,18,19} of e_sales table be 100.

Figure 8:
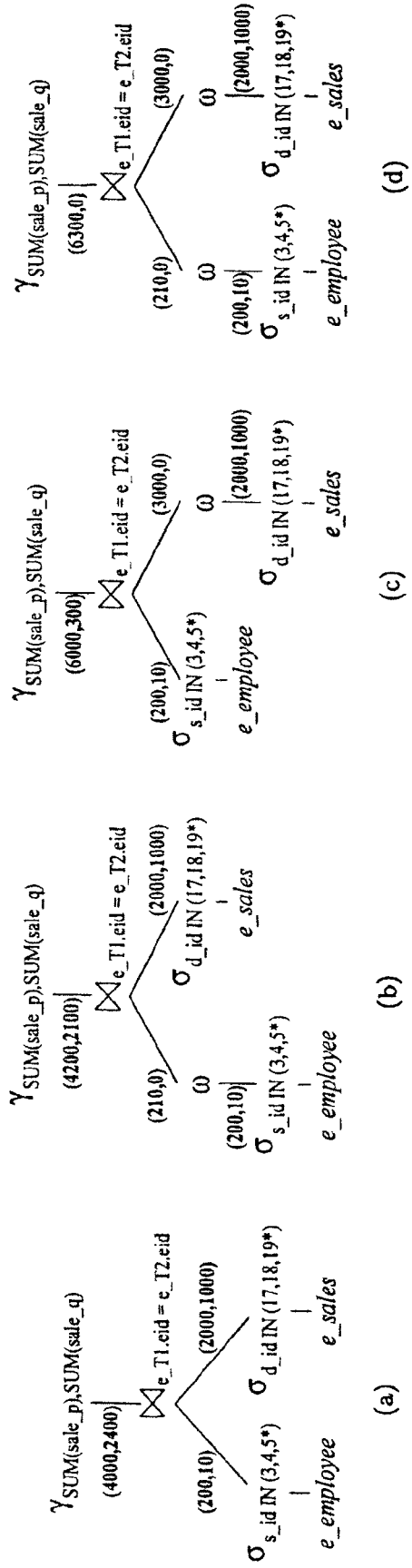
FIGS. 8(a)-(d) illustrate alternative query plans for a reduced maybe set.

Based on this scenario, a possible query execution tree is shown in FIG. 8(a). Labels on the edges (the numbers in parentheses) indicate the number of records that could be evaluated certainly (the first number in parentheses), and number of records that could not be evaluated certainly (the second number in parentheses), constituting maybe part of the results, by the operator. Adornment (*) indicates the partition is partially overlapped with the corresponding original query condition. For example, the first selection operator, $\sigma_{S\_id}$ IN (3,4,5), certainly retrieves 200 records, which are from two fully overlapped partitions, 3 and 4; and 10 records, which are from partially overlapped partition, 5, falling into maybe part of the results. Number of certain and maybe records fed to the SUM function are 4000 and 2400, respectively.

6.10 Use of Filtering Operator ($\omega$)

FIG. 8(b) shows an alternative strategy to evaluate the query in which, after the evaluation of the first selection, $\sigma_{s\_id}$ IN (3,4,5), the server communicates with the client by sending only the maybe records (along with record identifiers (RIDS)) for filtering. The client decrypts those records, filters out the false positives, and sends back only the RIDS, which correspond to true positives, to the server. This operation is represented by an $\omega$ operator in the query execution tree. Output of this operator includes "only" certain records. Due to this operation, the number of maybe records that has to be sent to the client is reduced to 2100 at the end and the total cost of the plan is 2110. Note that, since $\omega$ operator sends maybe records to the client for intermediate processing, the number of those records (for this example, 10 due to bucket number 5) are added to the total cost. FIG. 8(c) shows the similar procedure if the $\omega$ operator is applied over the second selection, $\sigma_{d\_id}$ IN (17,18,19) In this case, the number of maybe records is reduced to 300 and total cost is 1300, which is a significant decrease from the original query and the previous execution plans.

6.11 Optimization Algorithm

The example above illustrates that the client-cost (i.e., number of maybe records) depends upon whether or not we filter the results of intermediate operations to remove the uncertainty, thereby converting a subset of maybe records into certain records. We can use a cost-based strategy to decide which subset of selection operations should be filtered using the $\omega$ operator in order to minimize the expected client-cost. This involves: (1) enumerating the possible subsets of the set of selection predicates that could be filtered using the $\omega$ operator, and (2) analyzing the cost for each possibility to choose the best strategy (plan).

We list the pseudocode of such an optimizer below:

Input: Query plan P for server site Query $Q^S$
Output: New query plan P'' (possibly including filtering)
1. P'' = P, minCost = planCost(P)
2. for all S ⊆ W
3.   $f_c$ = 0 /* reset filtering cost */
4.   for each $s_i$ ∈ S /* build new plan */
5.     place filtering operator $\omega_i$
6.     $f_c = f_c + C_{s_i}$
        where $C_{s_i}$ = # of records sent by $\omega_i$
7.   end for
8.   $e_c$ = total # of records sent to client by P'
9.   planCost(P') = $f_c + e_c$
10.  if planCost(P') < minCost
11.    then {minCost = planCost(P'); P'' = P';}
12. end for
13. return P''

In the above pseudocode, W refers to the set of atomic conditions $C_i$ of the query.

Enumerating the set of possible plans (by listing subsets of conditions that could be filtered) is straightforward. The only challenge is in determining, given a plan P, its cost planCost (P)–total number of records sent to client for processing at any stage of query execution. This cost consists of two components: (1) number of tuples that are transmitted by various $\omega$ operators in the plan to the client (indicated as f in the algorithm); and (2) the size of the resulting maybe set that will finally be transmitted to the client for postprocessing (indicated as $e_c$ in the algorithm). The cost of $\omega$ operators can be determined by exploiting the metadata (maintained at the client) about cardinality of partitions being filtered by $\omega$. The size of the final maybe set for a strategy can be estimated using standard selectivity estimation techniques for relational operators given the metadata (e.g., size) of input relations maintained at the client.

The above optimization can significantly improve performance specially for complex queries where uncertainty about a few records, lower in the corresponding query tree, could magnify into a very large maybe set due to a join/cartesian product. By filtering such records early, significant savings can be accrued. Note that our strategy does not just reduce client-cost—its important side effect is reduction in network cost. Moreover, since additional records get filtered early, it could also result in some server side savings as well. For example, query plans given in FIG. 8(a) and FIG. 8(d) reduce the number of records sent over the network by 1390 from 2400 to 1010. Similarly, the number of records processed by the server is reduced by 100, from 9610 to 9510.

While the cost-based approach may improve performance, it comes at the price of software complexity due to additional collaboration between the client and the server in computing the query. Note that in our basic strategy, a client query is mapped into two server side queries $Q_m^S$ and $Q_c^S$. If we are to use the optimized strategy, the mapping of the query processing strategy induced by the chosen plan may result in many serverside queries. For example, the strategy suggested in FIG. 8(d) will first require a server side query to compute the two selections. The results of these queries will be decrypted and filtered at the client which will then return the qualifying list of record RIDS to the server. These RIDS will need to be stored into temporary relations. These tables, along with the original encrypted relation, will be used to determine the final maybe record set (to be returned), as well as, an aggregation over the certain set.

7. Logic Of Preferred Embodiment

Figure 9:
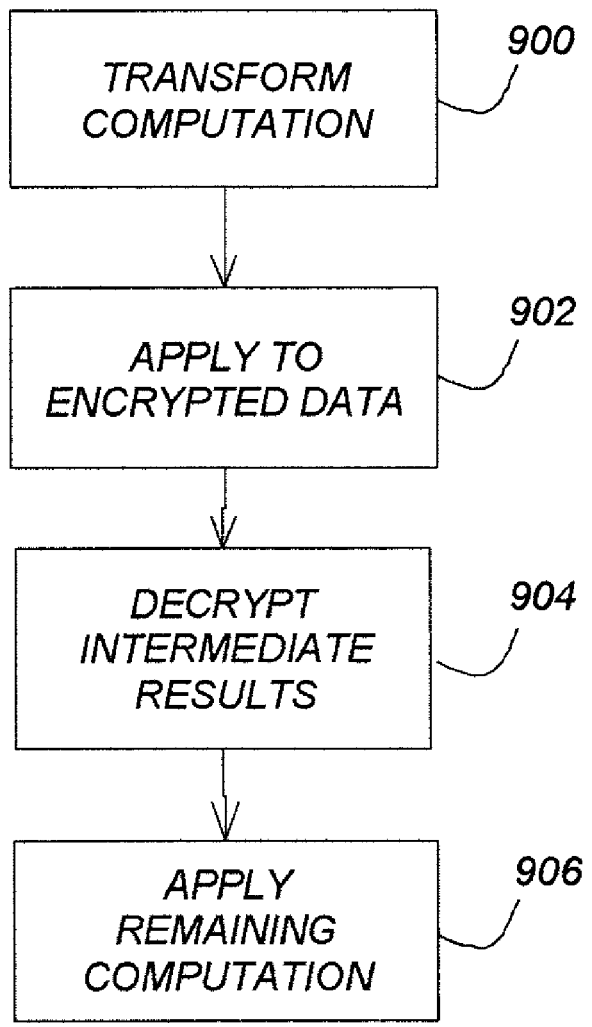
FIG. 9 is a flowchart illustrating a method of performing computations on encrypted data stored on a computer system according to the preferred embodiment of the present invention

FIG. 9 is a flowchart illustrating a method of performing computations on encrypted data stored on a computer system according to the preferred embodiment of the present invention.

Block 900 represents the step of transforming a computation formulated to be performed on unencrypted data so that at least a portion of the computation can be applied to the encrypted data.

Block 902 represents the step of applying the transformed computation to the encrypted data in order to obtain intermediate encrypted results.

Block 904 represents the step of decrypting the intermediate encrypted results.

Block 906 represents the step of applying at least a remaining portion of the computation to the decrypted results in order to obtain actual results for the computation.

Preferably, the transforming step 900, decrypting step 904 and applying step 906 are performed by a client computer and the applying step 902 is performed by a server computer. Consequently, the server computer stores the encrypted data, the client computer sends the transformed computation to the server computer, and the server computer sends the intermediate encrypted results to the client computer.

In one embodiment, additional information is stored with the encrypted data, wherein the additional information comprises one or more partition ids associated with at least one attribute of the encrypted data. The partition ids are created by partitioning a value domain of the attribute of the encrypted data and labeling partitions resulting therefrom. Preferably, the partitions cover a whole of the value domain, and the partitions do not overlap.

As a result, Block 900 further comprises the step of partitioning at least one operation of the computation for execution across the client computer and the server computer, as set forth below:

- the operation comprises a selection operation, a relation referenced by the selection operation is transmitted from the server computer to the client computer, the relation is decrypted by the client computer, and the selection operation is performed by the client computer on the decrypted relation;
- the operation comprises a selection operation, the selection operation is partially computed at the server computer using the partition ids associated with the attributes, the results therefrom are decrypted by the client computer, and the decrypted results are filtered by the client computer to complete the selection operation;
- the operation comprises a join operation, the join operation is partially computed at the server computer using the partition ids associated with the attributes, the results therefrom are decrypted by the client computer, and the decrypted results are filtered by the client computer to complete the join operation;
- the operation comprises a grouping and aggregation operation, the grouping operation is partially performed at the server computer using the partition ids associated with the attributes, the results therefrom are decrypted by the client computer, the grouping operation is completed on the decrypted results by the client computer, and the aggregation operation is performed by the client computer on results therefrom;
- the operation comprises a sorting operation, a grouping operation is performed at the server computer using the partition ids associated with the attributes, results from the grouping operation are decrypted by the client computer, and the sorting operation is completed on the decrypted results by the client computer;
- the operation comprises a duplicate elimination operation, a grouping operation is performed at the server computer using the partition ids associated with the attributes, results from the grouping operation are decrypted by the client computer, and the duplicate elimination operation is completed on the decrypted results by the client computer;
- the operation comprises a set difference operation, a left outer join operation is performed at the server computer using the partition ids associated with the attributes, results from the left outer join operation are decrypted by the client computer, and the set difference operation is completed on the decrypted results by the client computer;
- the operation comprises a union operation, the union join operation is performed at the server computer using the partition ids associated with the attributes, results from the left outer join operation are decrypted by the client computer, and the union operation is completed on the decrypted results by the client computer;
- the operation comprises a projection operation, a relation is transmitted from the server computer to the client computer, the relation is decrypted by the client computer, and the projection operation is performed by the client computer on the decrypted relation; or
- the operation comprises a projection operation, a relation is transmitted from the server computer to the client computer, the relation is decrypted by the client computer, and the projection operation is performed by the client computer on the decrypted relation.

In another embodiment, additional information is stored with the encrypted data, wherein the additional information comprises results from one or more modulo divisions of the attribute by components of an encryption key.

As a result, Block 900 further comprises the step of partitioning at least one operation of the computation for execution across the client computer and the server computer, as set forth below:

- the operation comprises an aggregation operation, the aggregation operation is partially performed at the server computer using the results from the modulo divisions of the attribute by the components of the encryption key, results therefrom are decrypted by the client computer, and the aggregation operation is completed on the decrypted results by the client computer.

With regard to the applying step of Block 902, this may also comprise step of applying the transformed computation to the encrypted data using one or more privacy homomorphisms that support arithmetic operations on the encrypted data, wherein the arithmetic operations are defined in modular arithmetic and a modulo divisor n is selected such that $n=p*q$, where an encryption key for the encrypted data comprises $k=(p,q)$, and results from the modular arithmetic fall in a range defined by $[0,n)$.

The arithmetic operations may include:

- a division operation that is supported by leaving a result in fractional form by computing a numerator and a denominator of the division separately, and then returning the numerator and a denominator to the client computer which decrypts the encrypted data and completes the division operation using the decrypted data;
- floating point numbers that are represented as fractions;
- negative numbers that are mapped to shifted values in a new range, and the shifted values are returned to the client computer, which decrypts the encrypted data and maps the shifted values to the negative numbers; or
- random noise that is added to the encrypted data, so that the arithmetic operations are prevented from testing for equality, and the random noise is removed from the encrypted data at the client computer after decryption.

Although FIG. 9 is described in terms of a method, those skilled in the art will recognize that it could be described in terms of a computer-implemented apparatus for performing computations on encrypted data, or an article of manufacture embodying logic for performing computations on encrypted data stored on a computer system.

10 REFERENCES

The following references are incorporated by reference herein:

[1] AES. Advanced Encryption Standard. National Institute of Science and Technology, FIPS 197, 2001.
[2] D. Song and D. Wagner and A. Perrig. Search on encrypted data. In Proc. of IEEE SRSP, 2000.
[3] DES. Data Encryption Standard. FIPS PUB 46, Federal Information Processing Standards Publication, 1977.
[4] H. Garcia-Molina, J. Ullman, and J. Widom. Database Systems: The Complete Book. Prentice Hall, 2002.
[5] H. Hacigümü, B. Iyer, C. Li, and S. Mehrotra. Executing SQL over Encrypted Data in Database-Service-Provider Model. Technical Report TR-DB-02-02, Database Research Group at University of California, Irvine, 2002.
[6] H. Hacigümü, B. Iyer, and S. Mehrotra. Providing Database as a Service. In Proc. of ICDE, 2002.
[7] Y. E. Ioannidis and V. Poosala. Histogram-based approximation of set-valued query answers. In Proc. of VLDB, pages 174-185, 1999.
[8] H. V. Jagadish, H. Jin, B. C. Ooi, and K.-L. Tan. Global optimization of histograms. In Proc. of ACM SIGMOD, 2001.
[9] G. Piatatetsky-Shapiro and C. Connell. Accurate estimation of the number of tuples satisfying a condition. In Proc. of ACM SIGMOD, 1984.
[10] R. L. Rivest, L. M. Adleman, and M. Dertouzos. On Data Banks and Privacy Homomorphisms. In Foundations of Secure Computation, pages 169-178, 1978.
[11] R. L. Rivest, A. Shamir, and L. M. Adleman. A method for obtaining digital signatures and public key cryptosystems. Communications of the ACM, 21(2): 120-126, 1978.
[12] B. Schneier. Description of a new variable-length key, block cipher (blowfish), fast software encryption. In Cambridge Security Workshop Proceedings, 1994.
[13] A. Silberschatz, H. F. Korth, and S. Sudarshan. Database System Concepts, 3rd Edition. McGraw-Hill Book Company, 1997.
[14] TPC-H. Benchmark Specification. http://www.tpc.org.
[15] M. Winslett and J. D. Ullman. Jeffrey D. Ullman speaks out on the future of higher. education, startups, database theory, and more. SIGMOD Record, 30(3), 2001.
[16] N. R. Adam and J. C. Wortmann. Security-control methods for statistical databases: A comparative study. ACM Computing Surveys, 21(4), 1989.
[17] R. Agrawal and J. Kiernan. Watermarking relational databases. In Proc. of VLDB, 2002.
[18] R. Agrawal, J. Kiernan, R. Srikant, and Y. Xu. Hippocratic databases. In Proc. of VLDB, 2002.
[19] N. Ahituv, Y. Lapid, and S. Neumann. Processing Encrypted Data. Communications of the ACM, 30(9):777-780, 1987.
[20] ANSI. Database Language SQL, 1992. Standard X3.135-1992, Also ISO/IEC 9075: 1992.
[21] L. Bouganim and P. Pucheral. Chip-secured data access: Confidential data on untrusted servers. In Proc. of VLDB, 2002.
[22] E. Brickell and Y. Yacobi. On Privacy Homomorphisms. In Proc. Adavances in Cryptology Eurocrypt '87, 1988.
[23] D. Buell and R. Ward. A Multiprecise Integer Arithmetic Package. Journal of Supercomputing, 1989.
[24] J. Cho and S. Itajagopalan. A Fast Regular Expression Indexing Engine. In Proc. of ICDE, 2002.
[25] ComputerWorld. J.P. Morgan signs outsourcing deal with IBM. Dec. 30, 2002.
[26] ComputerWorld. Business Process Outsourcing. Jan. 1, 2001.
[27] Digital Bibliography & Library Project. http://dblp.uni-trier.de/.
[28] J. Domingo-Ferrer. A new privacy homomorphism and applications. Information Processing Letters, 6(5):277-282, 1996.
[29] J. Domingo-Ferrer. Multi-applications smart cards and encrypted data processing. Future Generation Computer Systems, 13:65-74, 1997.
[30] H. Gaines. Cryptanalysis; a study of ciphers and their solution. Dover, 1956.
[31] T. Granlund. The GNU Multiple Precision Arithmetic Library, edition 2.0.2. T M G Datakonsult, 1996.
[32] H. Hacigümü, B. Iyer, C. Li, and S. Mehrotra. Executing SQL over Encrypted Data in Database Service Provider Model. In Proc. of ACM SIGMOD, 2002.
[33] H. Hacigiimü, B. Iyer, and S. Mehrotra. Encrypted Database Integrity in Database Service Provider Model. In Proc. of International Workshop on Certification and Security in E-Services (CSES '02), IFIP WCC, 2002.
[34] J. He and M. Wang. Cryptography and relational database management systems. In Proc. of IDEAS '01, 2001.
[35] D. R. Menezes, P. C. van Oorschot, and S. A. Vanstone. Handbook of Applied Cryptography. CRC Press, 1997.
[36] B. Serpette, J. Vuillemin, and J.-C. Herve. BigNum: a portable and efficient package for arbitrary-precision arithmetic. Technical Report 2, 1989.
[37] M. Shand, P. Benin, and J. Vuillemin. Hardware speed-ups in long integer multiplication. In Proc. of ACM Symposium on Parallel Algorithms and Architectures, pages 138-145, 1990.
[38] D. R. Stinson. Cryptography: Theory and Practice. CRC Press, 1995.
[39] J. F. Traub, Y. Yemini, and H. Wozniakowski. The statistical security of a statistical database. ACM Transactions on Database Systems (TODS), 9(4):672-679, 1984.
[40] J. Vuillemin, P. Bertin, D. Roncin, M. Shand, H. Touati, and P. Boucard. Programmable active memories: Reconfigurable systems come of age. IEEE Transactions on VLSI Systems, 4(1):56-69, 1996.

11 CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program performing database queries with the need for encryption could benefit from the present invention.

In summary, the present invention discloses a client-server relational database system, wherein data from the client computer is encrypted and hosted by the server computer, the encrypted data is operated upon by the server computer, using one or more operators selected from a group of operators comprising: (a) inequality logic operators, (b) aggregation operators, and (c) wildcard matching operators, to produce an intermediate results set, the intermediate results set is sent from the server computer to the client computer, and the intermediate results set is decrypted and filtered by the client computer to produce actual results. The group of operators is limited because the encrypted results set, when decrypted, includes inaccuracies therein. The client computer applies a set of correction procedures to the decrypted results set to remove the inaccuracies therein.

The foregoing description of the preferred embodiment of the invention has been presented for the purposes of illustration and description. It is not intended to be exhaustive or to limit the invention to the precise form disclosed. Many modifications and variations are possible in light of the above teaching.

What is claimed is:

1. A method of storing and accessing data in a client-server relational database system, comprising:
    encrypting data from a client computer;
    storing the encrypted data at a server computer;
    performing a query against the encrypted data stored at the server computer to produce an encrypted intermediate results set;
    sending the encrypted intermediate results set from the server computer to the client computer;
    decrypting and filtering the encrypted intermediate results set at the client computer to produce unencrypted actual results for the query, such that the data is always encrypted when it is stored at or processed by the server computer and the encrypted data is never decrypted by the server computer.

2. The method of claim 1, wherein the encrypted data is operated upon by the server computer using one or more inequality logic operators.

3. The method of claim 1, wherein the encrypted data is operated upon by the server computer using one or more aggregation operators.

4. The method of claim 1, wherein the encrypted data is operated upon by the server computer using one or more wildcard matching operators.

5. The method of claim 1, wherein the encrypted intermediate results set includes inaccuracies therein.

6. The method of claim 5, wherein the client computer applies one or more correction procedures to the decrypted results set to remove the inaccuracies therein.

7. An article of manufacture comprising a program storage device for storing instructions that, when read and executed by one or more computers, result in the computers performing a method of storing and accessing data in a client-server relational database system, comprising:
    encrypting data from a client computer;
    storing the encrypted data at a server computer;
    performing a query against the encrypted data stored at the server computer to produce an encrypted intermediate results set;
    sending the encrypted intermediate results set from the server computer to the client computer;
    decrypting and filtering the encrypted intermediate results set at the client computer to produce unencrypted actual results for the query, such that the data is always encrypted when it is stored at or processed by the server computer and the encrypted data is never decrypted by the server computer.

8. The article of claim 7, wherein the encrypted data is operated upon by the server computer using one or more inequality logic operators.

9. The article of claim 7, wherein the encrypted data is operated upon by the server computer using one or more aggregation operators.

10. The article of claim 7, wherein the encrypted data is operated upon by the server computer using one or more wildcard matching operators.

11. The article of claim 7, wherein the encrypted intermediate results set includes inaccuracies therein.

12. The article of claim 11, wherein the client computer applies one or more correction procedures to the decrypted results set to remove the inaccuracies therein.

* * * * *